United States Patent [19]

Blandy et al.

[11] Patent Number: 5,237,668
[45] Date of Patent: Aug. 17, 1993

[54] PROCESS USING VIRTUAL ADDRESSING IN A NON-PRIVILEGED INSTRUCTION TO CONTROL THE COPYING OF A PAGE OF DATA IN OR BETWEEN MULTIPLE MEDIA

[75] Inventors: Geoffrey O. Blandy, New Paltz; David B. Emmes, Poughkeepsie; Ronald F. Hill, Wappingers Falls; David B. Lindquist, Poughkeepsie; Kenneth E. Plambeck, Poughkeepsie; Casper A. Scalzi, Poughkeepsie; Richard J. Schmalz, Wappingers Falls, all of N.Y.

[73] Assignee: International Business Machines Corporation, Armonk, N.Y.

[21] Appl. No.: 424,797

[22] Filed: Oct. 20, 1989

[51] Int. Cl.[5] .................... G06F 12/10; G06F 13/00
[52] U.S. Cl. .................... 395/400; 395/425; 395/800; 364/DIG. 1; 364/DIG. 2
[58] Field of Search ... 364/200 MS File, 900 MS File; 395/400, 425, 800

[56] References Cited

U.S. PATENT DOCUMENTS

| | | | |
|---|---|---|---|
| 4,038,645 | 7/1977 | Birney et al. | 364/200 |
| 4,355,355 | 10/1982 | Butwell et al. | 364/200 |
| 4,476,524 | 10/1984 | Brown et al. | 364/200 |
| 4,495,575 | 1/1985 | Eguchi | 364/200 |
| 4,500,952 | 2/1985 | Heller et al. | 364/200 |
| 4,521,846 | 6/1985 | Scalzi et al. | 364/200 |
| 4,604,688 | 8/1986 | Tone | 364/200 |
| 4,763,244 | 8/1988 | Moyer et al. | 364/200 |
| 4,775,955 | 10/1988 | Liu | 364/200 |
| 4,999,770 | 3/1991 | Ara et al. | 364/200 |
| 5,023,773 | 6/1991 | Baum et al. | 364/200 |

FOREIGN PATENT DOCUMENTS 0214870 3/1987 European Pat. Off.

Primary Examiner—Joseph L. Dixon
Assistant Examiner—Michael A. Whitfield
Attorney, Agent, or Firm—Bernard M. Goldman

[57] ABSTRACT

A single non-privileged instruction copies a page of data from a source virtual address in an electronic medium to a destination virtual address in the same or in a different electronic storage medium, and without the intervention of any supervisory program when each medium and the virtual addresses are previously determined. The instruction is not required to specify which medium it will use, does not require its user to know what backing medium it will access, does not require main storage (MS) to be its backing medium, and allows different types of physical addressing to be used by different media. The instruction can lock any page for use in a multi-processor (MP). No physical direction of data movement is provided within the non-privileged machine instruction, which only designates virtual direction of movement. The separation of virtual direction from physical direction is done by avoiding instruction control over selection of electronic media. The non-privileged instruction can nevertheless express a preference for obtaining a copy of the destination page in an electronic medium in which the content of the page can be processed by further instructions. Also, the instruction can cause invocation of a privileged control program to avoid the need for a following condition code test instruction. A privileged instruction is also provided to wait for the completion of the unprivileged instruction and to invalidate a non-MS medium page whether it is unlocked or locked, either correctly or incorrectly.

52 Claims, 17 Drawing Sheets

FIG. 1   INSTRUCTION ELEMENT
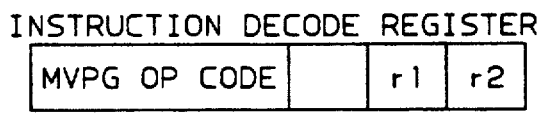
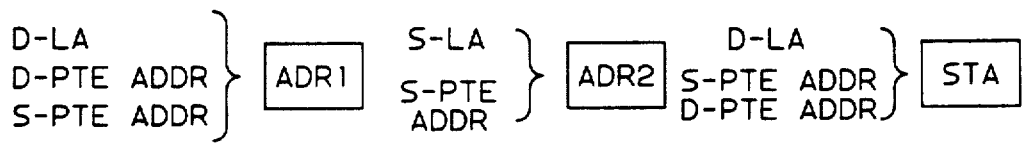
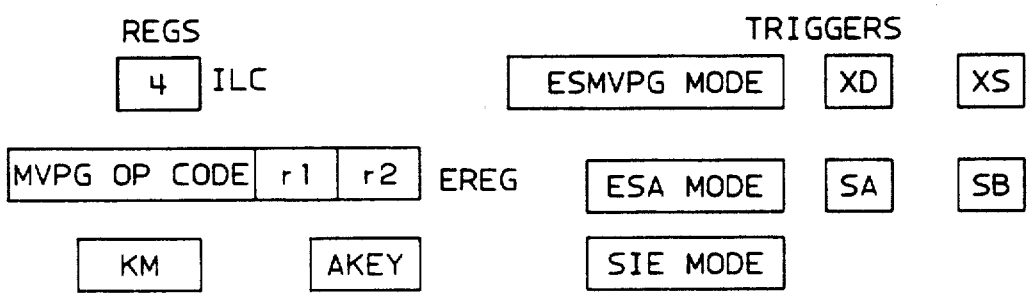
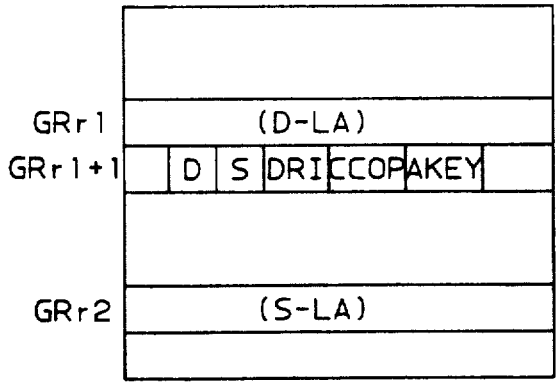
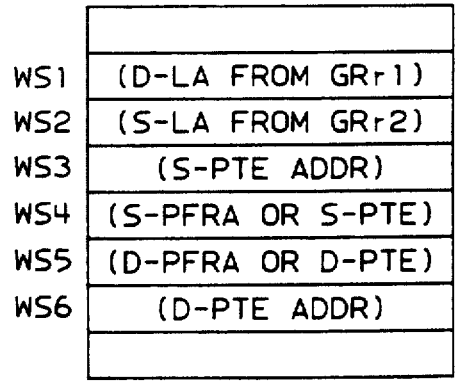
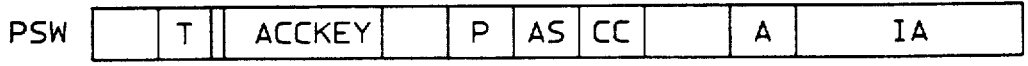

FIG. 2 BUFFER CONTROL ELEMENT (BCE)
REGISTERS
| PTE-ADDR |
| MS REAL ADDR |
TRIGGERS
| INV-PTE |   | EXCEPTION |
---
EXPANDED STORAGE CONTROLLER (ESC)
REGISTERS          TRIGGER
| ESADDR1 |        | DATA-ERR |
| ESADDR2 |
---
MAIN STORAGE (MS)
D-PTE
| ESBN OR PFRA | N | I | P | V | R | C | L | |
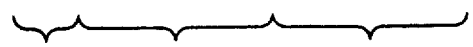
ES   ES & MS   ES
D-XPTE
| SKEY | F | | |
S-PTE
| ESBN OR PFRA | N | I | P | V | R | C | L | |
S-XPTE
| SKEY | F | | |
NOTE: PTE CONTAINS
    PFRA IF I.V=00
    ESBN IF I.V=11

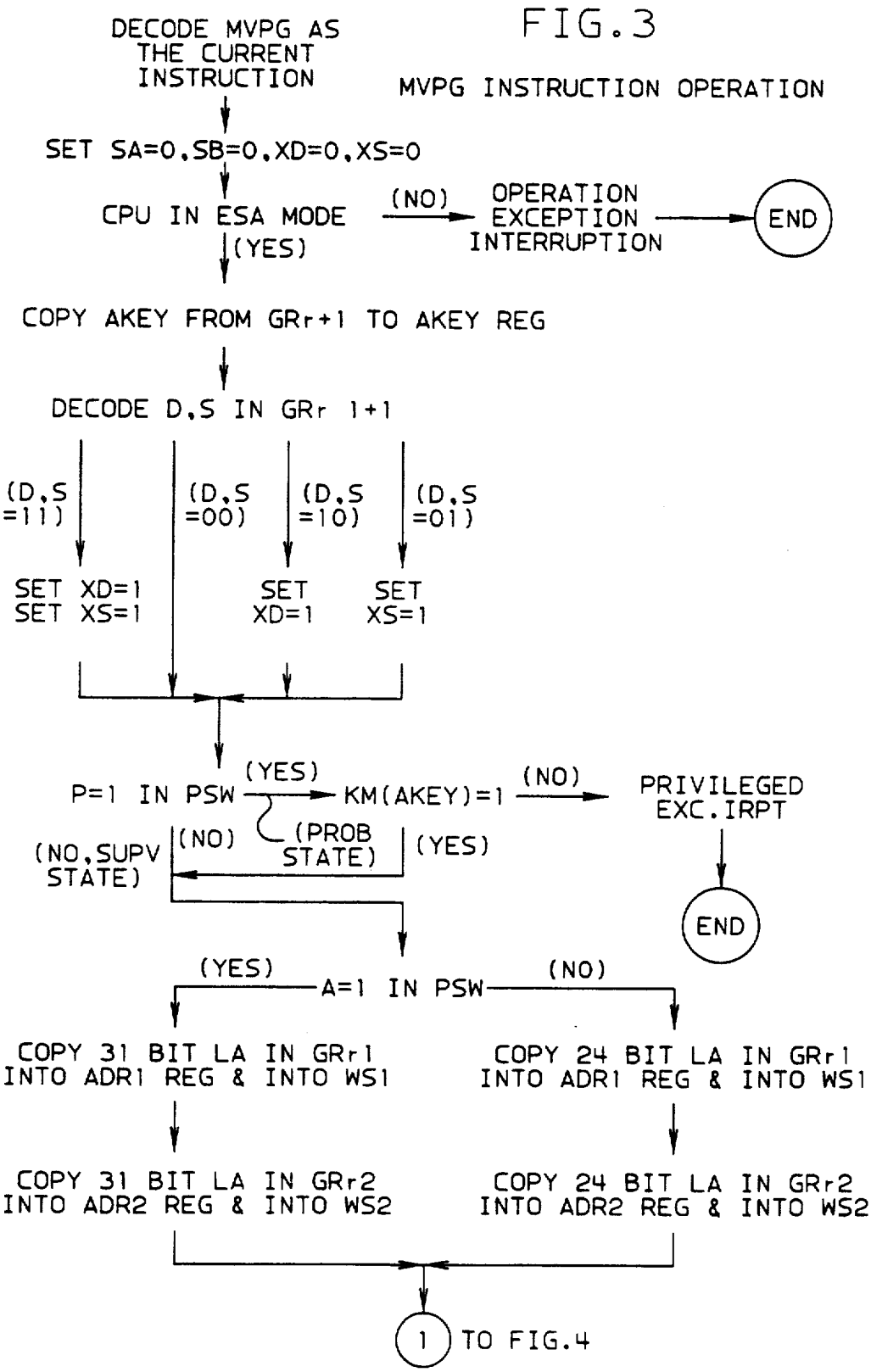

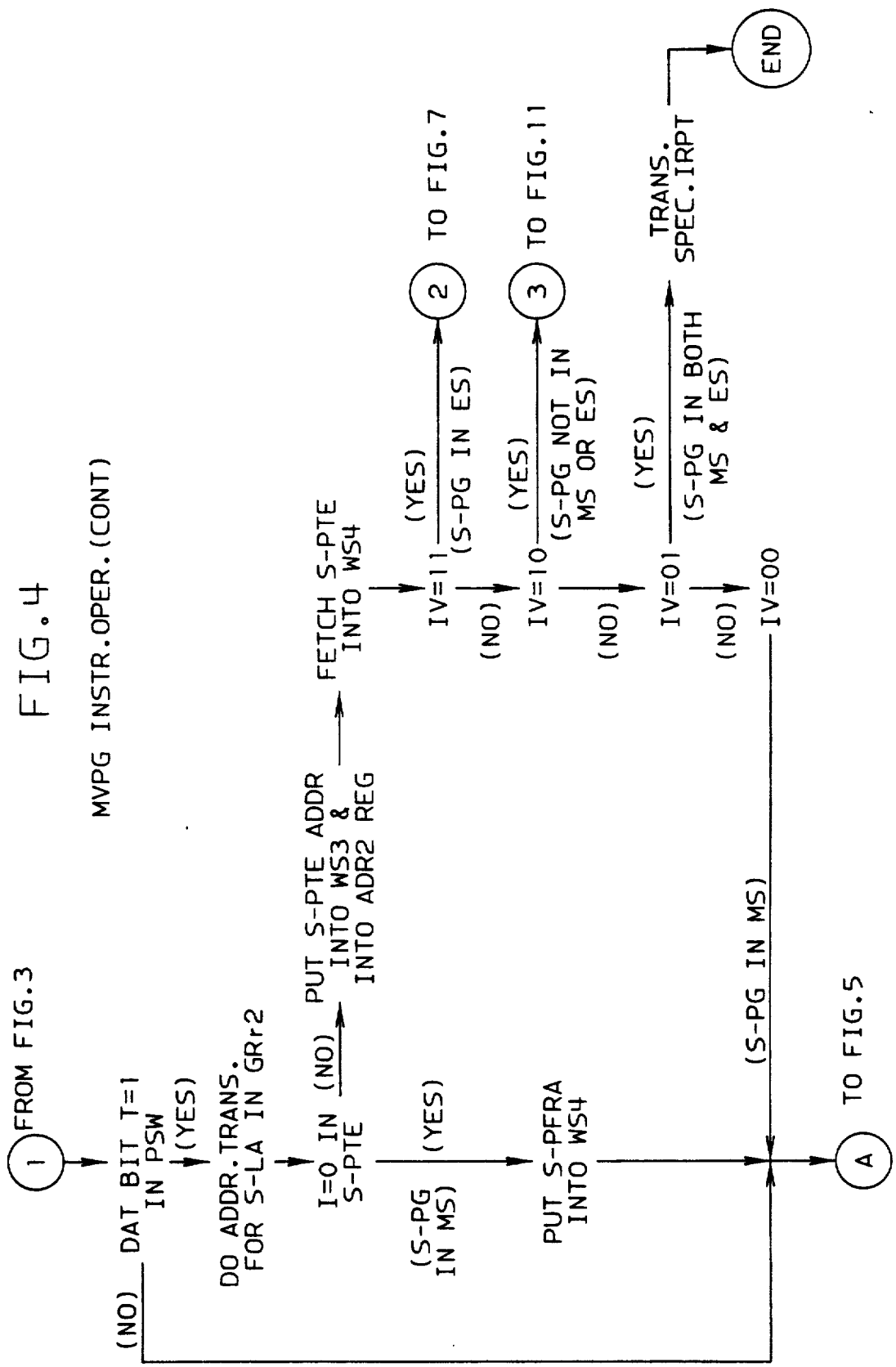

MVPG INSTR. OPER. (CONT)

FIG. 7 MVPG INSTR.OPER.(CONT)

FIG.9 MVPG INSTR.OPER.(CONT)

MVPG INSTR.OPER.
(CONT)

FIG.13 MVPG INSTR.OPERATION(CONT.)

FIG. 14 MVPG INSTR. OPERATION (CONT)

FIG. 15

INSTRUCTION ELEMENT        INSTRUCTION DECODE REGISTER

| IESBE OP CODE | r1 | r2 |

DST  ⎱ ADDRESS
STA  ⎰ REGISTERS

EXECUTION ELEMENT

| IESBE OP CODE | r1 | r2 | EREG

GR ARRAY                WORKING STORE

GRr1  | PT0 |           WS1

GRr2  | PX |

PSW | P |

TRIGGERS
| ESA MODE |
| ESMVPG MODE |
| RSP-CMPLT |

CR0 | TF |

SYSTEM CONTROL ELEMENT (SCE)
RSP-CP1
THRU       → AND →
RSP-CPn

BUFFER CONTROL ELEMENT (BCE)       MAIN STORE (MS)
TRIGGER                            PTE
| EXCEPTION |                      | ESBN OR PFRA | N | I | P | V | R | C | L |

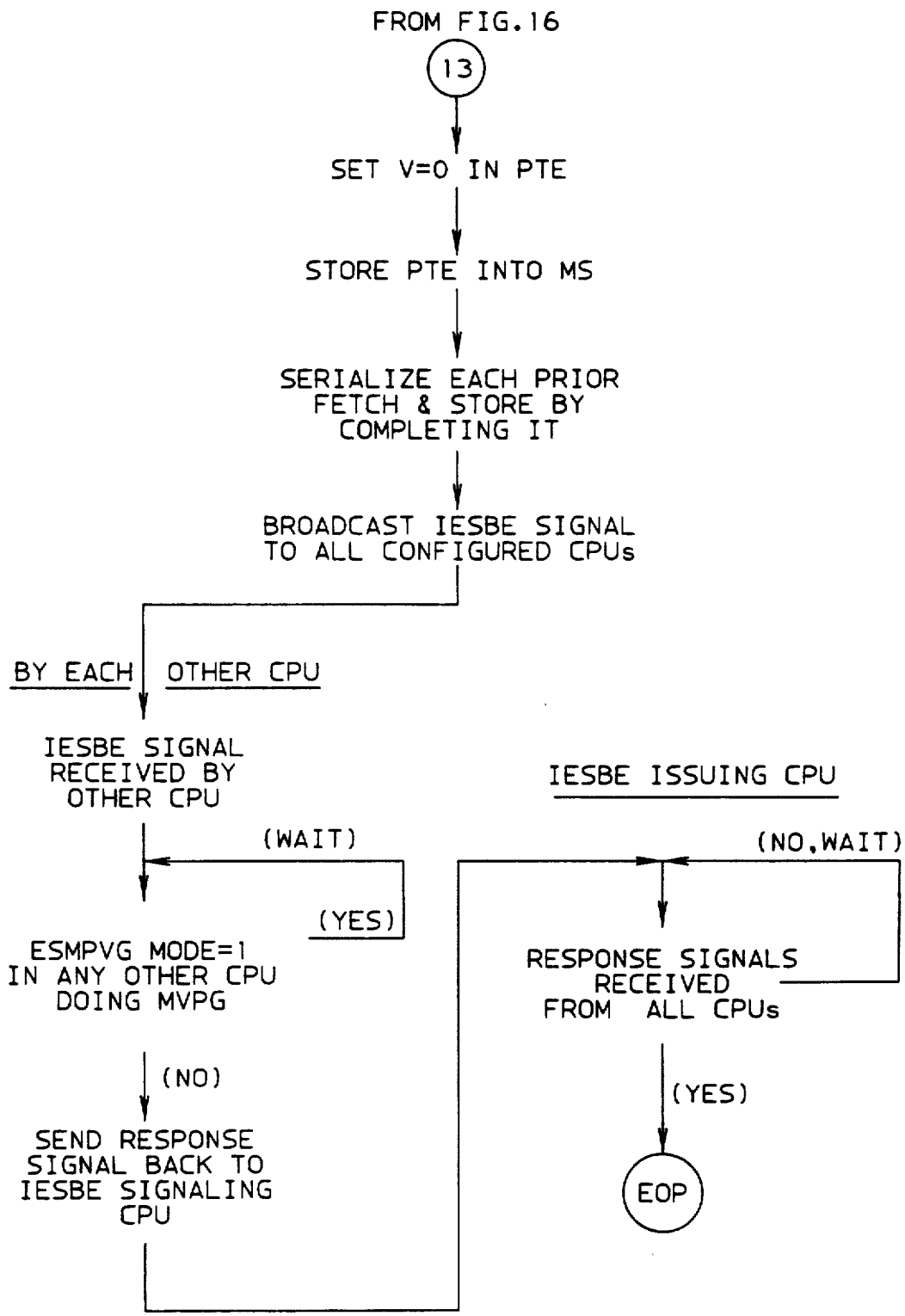
FIG. 17 IESBE INSTR. OPERATION (CONT.)

PROCESS USING VIRTUAL ADDRESSING IN A NON-PRIVILEGED INSTRUCTION TO CONTROL THE COPYING OF A PAGE OF DATA IN OR BETWEEN MULTIPLE MEDIA

INTRODUCTION

The invention relates virtual addressing control within machine instructions over the copying or moving of a fixed size large unit of data (for example, a 4 kilobyte page) within and between multiple electronic storage media of a data processing system. The invention enables a non-privileged user of a system to obtain a copy of a page of data from any of the multiple media whether or not it is restricted to privileged access. This is done by eliminating user control over selection of a privileged electronic medium, while allowing the user to express a desire for obtaining a copy of a source page of data in an electronic medium accessible to the user, whether or not the source page is copied from a privileged medium to which non-privileged users do not have direct access.

BACKGROUND

Some current data processing systems have more than one type of electronic (non-magnetic) storage, such as main storage (MS) and expanded storage (ES), which are the fastest of the large storage media in the system. MS must contain the instructions and data currently being executed by the system. Typically the MS address has 24 or 31 bits in computers built according to the widely used S/370 architecture, and the maximum MS size is accordingly limited to 2 to the 24th power, or 2 to the 31st power, respectively. ES effectively expands the size of the fast electronic storage in the system well beyond the maximum MS size without changing the number of bits in the MS address fixed by the system architecture.

Previously, whenever the active data and programs in the system were about to exceed the limits of the MS of a machine, a supervisory control program (such as the IBM MVS/370 program) moved lesser-used pages of data out of MS to auxiliary storage on DASD to free up space in MS. DASD speed has greatly increased over the past years, but it has slow access time which is greatly exceeded by the much faster access time of electronic storage (such as that used in MS and ES).

A way that has been found to expand the computer electronic storage without eliminating its MS storage constraints is to provide expanded storage (ES), in which the same number of address bits used for MS can also be used to address ES.

ES can have a much larger capacity than MS even when ES is limited to the same number of address bits as are used to address MS. This is because the same number of address bits can be used to address a much larger unit in ES than in MS in which a byte or word is generally the addressable unit. Currently, a 4096 byte page is the ES unit. Thus, the same number of address bits can address an ES memory that is 4096 times larger than an MS memory.

However, a memory that is addressed in page units is limited in the type of processing for which it can be directly used, since most programs do their processing in byte units. For example, a page memory may be usable for sorting strings comprised of page units, but it cannot be used for ordinary arithmetic processing which is done in byte units.

ES cannot be used as an addressable target for processor instructions provided for normal users. Because of this, no storage key has been provided to control direct ES access by processor instructions available to all users.

The most commonly used function for a page unit memory (ES) is for parking page units of data that cannot be kept in MS due to lack of MS space. Then ES may be used as a software managed lookaside cache for MS, so that pages of data can be retrieved at a much higher speed than they can be retrieved from DASD (direct access device, e.g. disk or drum) when required in MS.

Virtual addressing allows an operating system to provide shared use of a single physical MS without endangering the security or integrity of the users. Addressing in the user program is virtual. One or more address spaces contain the instructions and data of the program, and the program is written as if the bytes, words, and pages of these address spaces are contiguous in storage. This provides both convenience in programming in such an environment and the ability to share the real storage among multiple users but still maintain system integrity. A mechanism is provided which translates a virtual address to a real address during the interpretation of an instruction by a processor. The interface between this mechanism, called Dynamic Address Translation (DAT), and the privileged supervisory control program is a set of system control tables which specify whether or not the virtual pages reside in MS at any particular time and, if so, in which page frames of MS they are. If a virtual page is "backed" in MS, it is called "valid". Otherwise, it is "invalid". Instructions that address valid pages are executed directly by the processor, using the operands from MS. When an invalid operand is encountered, the processor signals the supervisory control program by means of an interruption. The control program assigns an available page frame of MS to the required virtual page, retrieves the page from the page cache in ES or DASD units, updates the system control tables to reflect the now-valid status of the retrieved page, and requests processor reexecution of the interrupted instruction. This process is invisible to the non-privileged user program and does not affect its program steps. Because the system control tables are under control of the privileged supervisory control program, multiple users may safely share MS through virtual addressing. The DAT mechanism provides the necessary isolation between them.

In the IBM S/370 system, the system control tables are in two levels for efficiency of storage use and are called Segment Tables and Page Tables. Each Page Table Entry (PTE) describes the status of a virtual page: valid or invalid; and, if valid, the MS address at which it may be found, and an indication as to whether or not a processor is to allow store operations into that page.

A logical address in the current S/370 architecture is an MS virtual address or an MS real address. If the state of the DAT bit is 1 in the current PSW of the processor, the logical addresses of the operands in the instructions are MS virtual addresses, and if the DAT bit is 0 they are MS real addresses.

Also, the prior art of processing includes the use of non-privileged move (copy) instructions in the IBM S/370 architecture. All of these move instructions are restricted to moving (copying) variable numbers of bytes of data in MS, and none can move data between multiple storage media. For example, the Move Long (MVCL) instruction can move a variable number of bytes from one MS location to another MS location, which are specified in the instruction parameters as a source logical address and a destination logical address. If any addressed byte is not located in an allocated MS page, an exception occurs in the instruction's execution, the instruction's execution is suppressed, interruption signals are stored, and the privileged control program is entered to allocate the page having that addressed byte, or take other action as required by the stored signals. The suppressed instruction is reexecuted when processing returns to the interrupted program.

In prior art, movement of a part of a page, or of a large number of pages, of data from a source storage location to a destination storage location was accomplished by using an S/370 MVCL (move character long) instruction, or by using an S/370 MVC (move character) loop routine, for which both the source and the destination pages had to have valid addresses in MS, and have their data transferred into the pages in MS, before the instruction execution could start. Whenever any MVCL instruction specified a virtual page invalid in MS, the processor signalled the supervisory control program with a page-translation exception, which interrupted the program containing the MVCL instruction and invoked the control program which translated the virtual address, assigned a page frame in MS, and transferred the data into the MS page frame from DASD or ES in the storage hierarchy.

Accordingly, the control program responded to each MVCL page fault by:
1. Translating the faulting virtual address to obtain a PTE address.
2. Assigning a page frame in MS for the faulting virtual page.
3. Performing an I/O or PAGEIN operation to bring the page contents into the assigned MS page frame.
4. Validating the PTE by setting its fields to reflect the existence of the page in MS.

Once both source page and destination page existed in MS for the MVCL instruction, it could perform its data transfer, which could be a data merge by replacing one or more bytes of data at any contiguous location in the destination page with data bytes copied from any contiguous location in the source page. Further, the copy/replace operation of the MVCL instruction could include any number of contiguous pages and parts of pages. As can be seen, up to three data transfer operations could be required: First, I/Oing data into page(s) at the source operand address. Second, I/Oing data into page(s) at the destination operand address. Third, transferring the data between the locations designated in the MVCL instruction which could be a part of one or more pages. (The subject invention avoids some of the data transfers required by these prior instructions when a full page of data is to be copied.)

Strict security requirements must be enforced in allowing the accessing of the pages of data on ES, since the pages transferred to ES from MS can be from any and all programs processing in MS, including privileged program data which can cause system failure if misused, and data of different problem programs each of which may have personal data to be kept private to itself.

Therefore, privileged (i.e. supervisory) state is required to use prior S/370 instructions that copied a page of data between MS and ES, which are the PAGEIN and PAGEOUT instructions; they are the subject of U.S. Pat. No. 4,476,524 to Brown et al entitled "Page Storage Control Methods and Means", assigned to the same assignee as the subject application. The prior PAGEIN and PAGEOUT instructions are not available for use by application programs, because they are constrained to supervisory state which restricts their use to system control programs, due to the security requirement that application programs not be allowed to directly access data on the ES medium. On the other hand, the subject invention provides an instruction for accessing ES that is usable by an application program while maintaining the required ES security. Further, the PAGEIN and PAGEOUT instructions can only use real addressing for accessing a source page and a destination page; while the subject invention can use virtual addressing. Also, the PAGEIN and PAGEOUT instructions are incapable of moving a page within one medium; they cannot move a page within MS or within ES as can the subject invention. And the PAGEIN and PAGEOUT instructions designate the storage media for each page copy operation by the operand locations in the instruction, while no storage media designation need be used for the subject invention although it may actually do a transfer between different media.

European patent application 0 214 870 (Yoshida et al, assigned to Fujitsu), and its corresponding Australian patent specification 564809 (Application number 62458/86) disclose an instruction for using logical addressing for transferring data elements between an extension memory (EM) and a main memory (MM). The operation code of this instruction designates the direction of transfer, and a different opcode is used for each transfer direction. The first operand (B1, D1) is dedicated to specifying a Main Memory logical address. The second operand (X2, B2, D2) is dedicated to specifying the Extended Memory logical address. The R1 operand specifies a variable number of elements to be transferred between EM and MM; any of its instructions can transfer a variable number of page units or non-page units. The operands in the instruction of this European patent are medium-dependent, while the operands are medium-independent in the instruction of the subject invention. The instructions in this patent do not use the virtual addressing as alleged, because actual virtual addressing does not require its user to specify the media being used, which are required for the operands of this patent's instructions along with having a different opcode for each different direction of data movement between different media. (In the subject invention, no media is required to be specified by any operand, and a specified user intent may not be granted in the instruction's execution. The instruction in the subject invention does not designate any direction of transfer between physical media, and uses the same opcode for all transfer directions. No variable number of data elements is specified, since one page is transferred by the instruction of the subject invention.)

Prior patent application (PO9-88-019) having Ser. No. 07/274,062 filed in the USA on Nov. 21, 1988 (and assigned to the same assignee as the subject application) discloses a supervisory program's window mapping service that initializes MS or ES pages in a virtual address space by mapping the pages to a portion of a linear data set on AS (auxiliary storage, i.e. DASD). This application allocates page frames in MS or ES, writes the allocated MS or ES addresses into the PTEs (page table entries) of the allocated page frames, locates the requested data in a linear data set on AS, and reads the AS data into the allocated pages in MS or ES to complete the process of initializing the pages that are being mapped to a desired part of the linear data set on AS. For an application program to use this supervisory program service, the application program must provide a program that specifies the mapping parameters, including the virtually addressed pages being mapped as well as the starting address on the AS data set. The operation of this prior art programming ends when the allocated pages are initialized to contain the data of the accessed window. When an operand in the window is found to be invalid in MS, the supervisory control program is invoked by interruptions and it must, using programming means, retrieve the required page from ES, update the mapping table to reflect validity of the page in MS, and request the processor to reexecute the instruction that caused the interruption. (On the other hand, the subject application is primarily concerned with handling pages after they have been initialized in MS or ES, so that the subject invention might be used after the process of application Ser. no. 07/274,062 has completed to copy some of the initialized pages in the same address space or to other address spaces regardless of whether they happen to be in MS or ES. Further, the subject invention does not require the user to specify each medium (MS or ES) being used. The invention optionally allows the user to express an intention of wanting MS as the destination page medium because it is expected that the page will be referenced by a subsequent instruction in the same program. But even when a user expresses an intention for MS, the supervisory control program can nevertheless refuse the user's intention and put the page in ES when indicated by system circumstances with the subject invention.)

Prior patent application (PO9-88-020) Ser. No. 07/274,239 filed Nov. 21, 1988 (and assigned to the same assignee as the subject application) discloses a novel type of address space called a NMDS (Non-MS Data Space, backed by ES only, or backed by ES and/or AS, but never backed by MS). (The NMDS is now called a hiperspace in the IBM MVS/ESA operating system.) The 07/274,239 application discloses program routines (which can only exist in a privileged operating system); only privileged programs are disclosed to move/copy a virtual-addressed page between an NMDS type of address space and a common type of address space (backed by MS, ES or AS and which contains both programs and data). The privileged program routines are: CREAD, CWRITE, SREAD, and SWRITE. Each of these privileged routines is comprised of plural instructions. Any of these privileged routines may be specified and invoked by a parameter-list routine placed in an application program. The parameter-list routine interrupts its application program by calling the privileged program containing these routines to execute the called routine, after which control is passed back to the calling application program. The ability of the 020 routines to directly access ES prevents them from being directly executed by a non-privileged application program. Furthermore the 07/274,239 privileged routines can only move a page between a NMDS and a program/data address space.

(Unlike the prior art, the subject application provides a non-privileged copy page instruction usable by both privileged and non-privileged programs (e.g. application programs) to perform a page copy in or between any type of address space(s), which may be backed in any media, including media with only privileged access such as ES and AS, and media with both privileged and non-privileged access such as MS. The token for any type of address space may be placed on any non-privileged user's access list for use by the invention. All security requirements for the privileged accesses are maintained without leaving the application program as long as the source page and destination page were previously allocated in one or more of the electronic storages. Unlike the prior art, the subject invention can copy pages from any type of virtual address space, including an NMDS, a data space or a program/data address space without requiring the user to know what medium backs the source page. And unlike the prior art, the subject invention can copy pages to any type of address space, including NMDS, a data space or a program/data address space without requiring the user to know what medium backs the destination page, although the invention also has the novel feature of allowing the user to express an intention of having MS as the destination medium without the user having control of the choice of the destination medium.)

The conventional cache-bypass used by IBM large systems does not prevent the CPU's cache from receiving data. The bypass merely sends data fetched from MS directly to the CPU's execution unit on a path that bypasses the cache in response to a cache miss, while also copying the same data in the cache. (The cache bypass of this invention does not copy into the cache any data fetched from MS or stored into MS when MS is not the destination medium, while this data is being sent to the execution unit in response to a cache miss on the copy operation.)

SUMMARY OF THE INVENTION

The invention provides a new way of enabling an application program in non-supervisor (i.e. non-privileged) state to use virtual addressing of operands in a machine instruction. The instruction is not required to specify which of the plural media it will use, does not require its user to know what backing media it will access, does not require MS to be one of its backing media, and allows different types of physical addressing to be used by the different backing media.

It is also a purpose of this invention to provide a non-privileged instruction that allows virtual addressing to be used to copy a page of data from a source virtual address to a destination virtual address, regardless of where the page resides physically in plural electronic storage media, and without the intervention of any supervisory program when the virtual addressing has been initialized for the subject pages.

It is another purpose of this invention to provide expedited page fault handling by the supervisory program if virtual addressing has not been previously set-up for any virtual page being accessed by the non-privileged page copy instruction.

It is still another purpose of this invention to allow a non-privileged user to avoid page fault handling by the supervisory program when a page that is not backed in any of the electronic storages (media) is encountered by a processor in a page copy operation so that in such a case the user program may instead request a control program service routine to copy a number of pages by programming means, on the expectation that most, or all, of the group of pages to be subsequently moved will also be found to not have been backed in any of the electronic media.

It is another purpose of this invention to make the use of expedited page fault handling optional to a non-privileged user of the page copy instruction by eliminating the need for a conditional branch instruction to test for any page fault exception.

It is also a purpose of this invention to enable the use of a conditional branch instruction to follow a page copy instruction, at the option of a non-privileged user. The conditional branch instruction tests for any page fault exception condition code due to virtual addressing having not been initialized for any page of the page copy instruction.

It is a further purpose of this invention to provide a page copy instruction that copies a page from a source virtual address to a destination virtual address without the user of the instruction expressing which of plural storage media shall back any of the virtual addresses.

It is a still further purpose of this invention to optionally allow a non-privileged user of a page copy instruction to express an intention that the destination page of the instruction should be backed in MS in order to influence a privileged control program to copy the page into MS.

It is a purpose of this invention to prevent data of the source page of a page copy instruction from being copied into a processor's cache.

It is also a purpose of this invention to provide the capability of preventing the data accessed for the source and destination pages of a page copy instruction from being inefficiently copied into a processor's cache, which occurs only if the user of the instruction expresses an intention in an instruction parameter that the destination page of the instruction be copied into MS. If the destination PTE selects the MS medium, the destination page is copied into MS and also into the cache. But, if the destination PTE does not select the MS medium, the instruction calls the supervisory control program to reexamine the medium selection by the destination PTE. If possible, the control program reassigns the destination page to MS and sets the PTE accordingly. Then the destination page will be copied into MS and the cache when the instruction is reexecuted. Where the cache is small, only the cache data unit containing the byte addressed by the destination operand may be copied into the cache, and the rest of the page is not then copied into the cache.

It is a further purpose of this invention to provide access control checking for ES pages by using an ES storage key stored in MS. (The conventional access protection checking for MS pages remains which uses the MS storage keys stored in the hardware key array of each processor.)

It is also a purpose of this invention to protect each access to an ES page by providing and using an ES storage key located with each page table entry (PTE).

It is another purpose of this invention to provide protection checking for each access to a page in ES by a move page instruction by providing an ES storage key located in an XPTE (external page table entry) located in MS in relation to the PTE for the ES page.

It is a further purpose of this invention to provide address translation for a virtual address that is backed by a physical page frame in the expanded storage (ES) of a data processing system.

It is another purpose of this invention to store reference and change indications for a page in ES by storing reference and change control fields with the PTE stored in MS for the page.

It is another purpose of this invention to provide locking control over the use and allocation of physical media for the virtual page operands of a page copy instruction while it is being executed by any processor in a multiprocessor (MP) system to prevent interference by any other processor with the page copy operation.

It is a purpose of this invention to prevent the copying into a processor's hardware cache of data accessed for an ES destination page, or for an MS or ES source page, of a page copy instruction, although the data of an MS destination page is put into the processor's cache if the instruction has a parameter that optionally indicates a user intention of having the destination page in MS.

It is another purpose of this invention to provide a lock field (L) in each valid-in-ES PTE that must be held by a processor when performing an MVPG instruction that accesses the ES block designated by that PTE. AS a result, a control program (that wishes to detach an expanded storage block from a PTE in order to use that block for some other purpose) may efficiently invalidate a valid-in-ES PTE by performing a S/370 Compare and Swap instruction that atomically determines that the ES block is not currently in use (i.e. L=0) and, if not, sets off the valid-in-ES bit (i.e. sets V=0) to indicate the page is invalid in ES.

It is a still another purpose of this invention to provide an ES lock field in each PTE so as to cause serial execution of multiple move page instructions involving the same page in a MP system, preventing the erroneous results that can be caused by simultaneous change operations by different processors in the same page.

It is a another purpose of this invention to use a supervisory control program to detect a PTE that has its ES lock field improperly set to an on state when the PTE is not being used by any processor.

It is a further purpose of this invention to provide a privileged instruction for disabling a lock bit in a PTE when invalidating an ES valid bit in the PTE. Then, the PTE may be used by the non-privileged move page instruction.

It is an additional purpose of this invention to expedite the simulation of the MVPG instruction when that instruction is executed by a processor running in interpretive execution mode under an S/370 SIE (start interpretive execution) instruction.

It is an additional purpose of this invention to also provide an IESBE (invalidate ES block entry) instruction which invalidates an ES page indicated in an addressed PTE. The IESBE instruction may be used when the execution of an MVPG instruction is prevented by a potentially erroneous L=1 lock bit setting in a PTE accessed by a MVPG instruction. The IESBE instruction is a privileged instruction that may be used by a supervisory control program to handle this condition.

The invention provides a non-privileged CPU instruction that enables a non-privileged program to use virtual addressing to copy (move) a page unit of data between two different virtual address spaces, or within the same virtual address space. The resultant virtual page move (copy) involves the physical copying of data from a source page to a destination page: within main storage (MS), or within expanded storage (ES), or between ES and MS in either direction. No privileged program intervention occurs for any of these page moves when the virtual addresses of the source and destination pages have previously been determined to be valid in the allowable media.

The CPU executing the page move instruction may have a cache. This invention may selectively activate a cache bypass to prevent the cache from receiving the data of a page being copied within or to ES; and the invention may activate the cache bypass when a page of data is copied within or to MS. Allowing the data from ES into the cache may force out existing cache data (via cache LRU controls) that has a likelihood of processor use. This ES/MS cache bypass control can improve processor efficiency by reducing cache misses that would be caused by allowing the cache to receive the ES data (which cannot be processed by the processor) and force out cache data which has a likelihood of processor use. But, in some circumstances, a significant likelihood exists that a page copied in MS will be immediately processed by instructions following the page move instruction of this invention.

The move page instruction copies a page of data from one virtual location to another virtual location in the same or different virtual address spaces. The actual physical locations of the source page and of the destination page generally is not a concern to the user of this instruction. Nor is the physical direction of the page move a user concern, since only the virtual direction of page movement is of concern to the user. This lack of physical knowledge by the user results in obtaining a high degree of security in the use of the system, since it allows the system to enforce rules of access to data that cannot be violated by a user not having knowledge of the physical location of the data. The resulting physical location of the copied page is known only to the supervisory control program of the system. However, this invention allows the user of the move page instruction to communicate to the supervisory program a desire that MS be the physical medium to receive the copied page, since system efficiency may thereby be increased. But this invention does not allow the user of the move page instruction to express any intention about which physical medium should contain the source page, since a source page intention will not increase system efficiency and the user generally does not care on what medium the source page exists.

Although MS real addresses may be used in the move page instruction (instead of virtual addresses, since logical addressing is supported by the instruction), it should be understood that ES real addresses cannot be used by a non-privileged instruction. ES real addresses are only available to privileged instructions (used by supervisory control programs). Hence, this invention provides the capability of preventing application programs (which use only non-privileged instructions) from using ES real addresses with the move page instruction.

A significant security advantage is obtained by the MVPG instruction only allowing an application-program user to have virtual addressability to ES. The user is not required to know the medium for the source page or destination page. The user is only required to know the virtual addresses. And an application program user is not allowed to know the translated addresses, which can only be observed using privileged instructions not available to an application program user.

By comparison, the prior art PAGEIN and PAGEOUT instructions in U.S. Pat. No. 4,476,524 (Brown et al) and in the IBM S/370 architecture can not be used by an application program for copying page(s) of data between ES and MS, because they are privileged instructions which only can be used by supervisory programs such as operating systems, control programs and hypervisors. This is because these prior PAGEIN and PAGEOUT instructions must designate the real address of a page in ES (not given to application program users) for copying a page of data between MS and ES. For security reasons only privileged programs are allowed to access ES.

Accordingly, application-program use of the MVPG instruction is obtained by having the processor hardware and microcode interface certain supervisory control functions required by the MVPG instruction without the knowledge of the user and which are not apparent to the user interface of the MVPG instruction. This eliminates the possibility of the user affecting the security of system supervisory states involved with the MVPG instruction.

The move page (MVPG) instruction does not actually move a page, but rather it copies a page from a second designated operand location (which may be a virtual address in one address space) to a first designated operand location (which may be a virtual address in another address space). The page at the second location (called a "source page") is not changed by execution of the MVPG instruction. But the page at the first location (called a "destination page") is changed by having a copy of the source page written over whatever data previously may have existed in the destination page.

The virtual address for each operand of the MVPG instruction is translatable either to a real address in MS or to a block number in ES, according to whether MS or ES is indicated as the backing medium in the page's PTE (page table entry). The MS/ES medium for each translated address is determined by the setting of a pair of control bits in the form of the PTE architected for use with each operand specification of the MVPG instruction when dynamic address translation is being used.

When the MVPG instruction is executed, the physical direction of the transfer is any of: ES to MS, MS to ES, MS to MS, or ES to ES, which is predetermined by the current medium selections in the PTE's for the source page and the destination page. If that predetermined physical direction differs from an expressed intention by the non-privileged user of the MVPG instruction that MS should be the destination medium, the MVPG instruction execution is ended by an exception interruption to obtain intervention by the supervisory program to determine if the current destination medium should be changed by the supervisory program. The supervisory program will consider the user request and will grant it if it does not conflict with overriding factors, such as whether the user's priority for MS space allocation is not currently high enough to allocate a page in MS for the user at this time.

The virtual address space(s) for the source page and the destination page in the MVPG instruction must be previously set up by privileged software executed before the MVPG instruction is executed. But the electronic media and the physical-location addresses for the backing pages need not have been determined when an MVPG instruction is executed. A page fault exception will occur during the execution if the physical address and electronic medium containing a page-operand have not been determined. In order to resolve the exceptions, the privileged supervisory software interfaced by this exception will generate and manipulate the PTE of the operand including setting its flag bits I and V to designate the electronic medium assigned by the supervisory program to contain the represented page. Then, software causes a processor to reexecute the instruction.

The MVPG instruction operation (from the time it starts executing to the time it ends its execution either successfully or unsuccessfully) is done by the processor and cannot be controlled by software. A condition code (CC) of zero indicates a successful end-of-processing (EOP) by the MVPG instruction. Any other condition code indicates an unsuccessful conclusion due to an exception condition occurring during its execution. An exception condition may also generate interrupt codes that are provided in predetermined MS locations to precisely indicate the particular exception condition. The interruption information is sufficient for the privileged system software which may be called by the interruption to correctly respond to the problem causing the exception.

Furthermore, the MVPG instruction is disclosed to operate in a multiprocessor (MP) system as well as in a uniprocessor environment, involving built-in controls using an ES lock bit L in a PTE provided with the instruction for coordinating its operation among all processors in an MP.

A simple register and register extended (RRE) instruction format is disclosed for the preferred embodiment of the MVPG instruction (i.e. an operation code with source and sink virtual address operand fields provided in general purpose registers, GRs). The conventional RRE instruction format provides a familiar user interface for S/370 instructions. However, this simple user interface does not reveal the complexity of the internal operation of the MVPG instruction, containing many novel processing features which may be structured in microcode and/or hardware.

Other instruction formats may also be provided for the MVPG instruction such as the RR, RX or SS formats to specify the virtual address operands of the instruction at storage address(es) instead of, or in addition to, general register(s).

Different forms of PTEs may be used automatically by the virtual address translations of this invention. The different forms of PTEs can be transparent to a non-privileged user of the move page instruction using the PTEs. Thus, the instruction will use whatever PTE form is accessed during address translation. The only requirement is that the MS medium field, I, be in the same location in the different forms allowed for a PTE, and that a predetermined location be used in all PTEs for the ES medium field (V) and that it have a particular state to indicate a valid-in-ES condition in one form of the PTE while that location has another predetermined state in another form of the PTE.

BRIEF SUMMARY OF THE DRAWINGS

FIGS. 1 and 2 represent hardware used by the processing of the move page (MVPG) instruction.

FIGS. 3 through 14 represent the execution processing of the move page (MVPG) instruction.

FIG. 15 represents hardware used in execution processing of the IESBE (invalidate expanded storage block entry) instruction.

FIGS. 16 and 17 represent the execution processing of the IESBE instruction.

DETAILED DESCRIPTION OF THE EMBODIMENT

Figure 5:
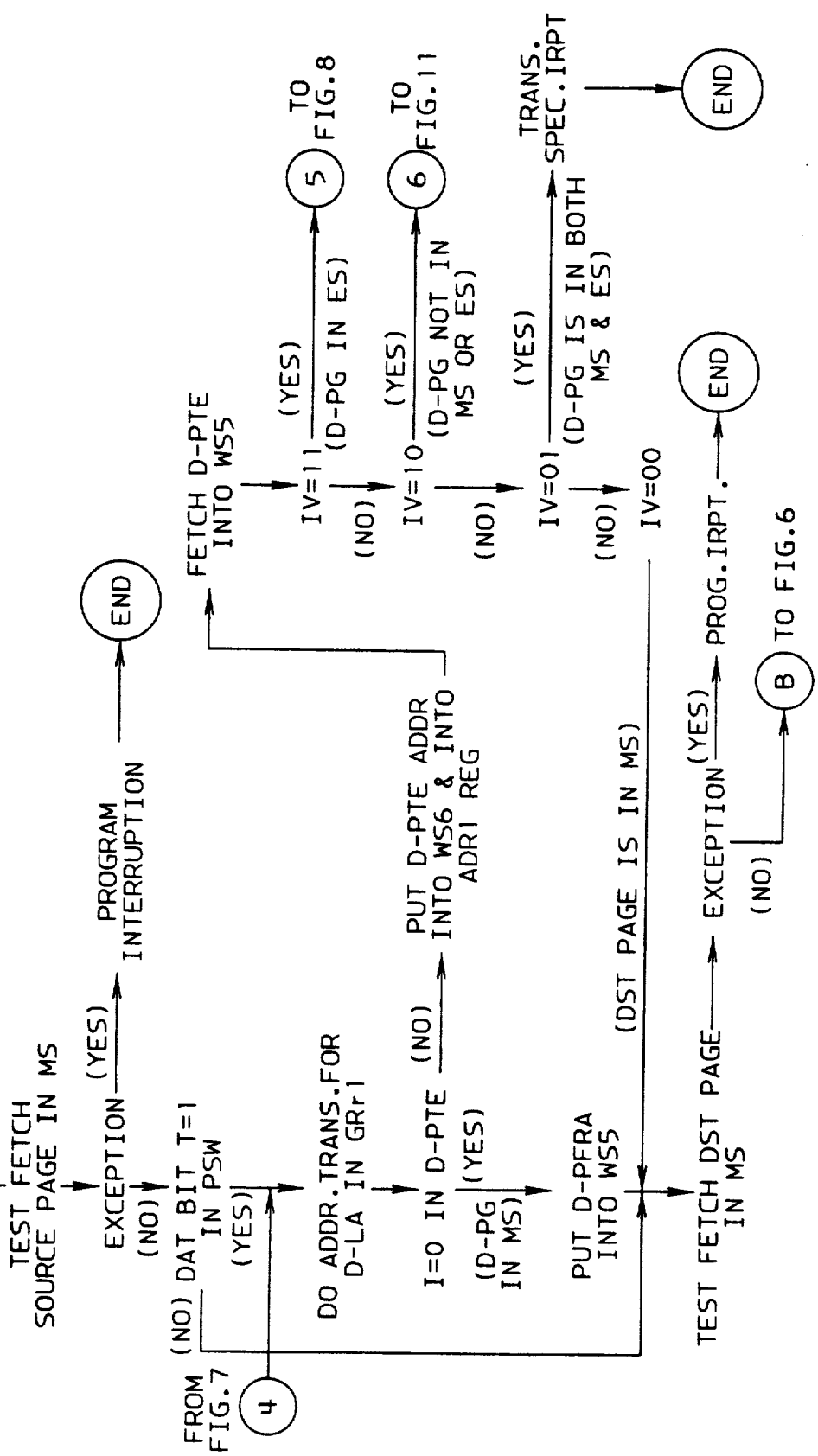
Figure 6:
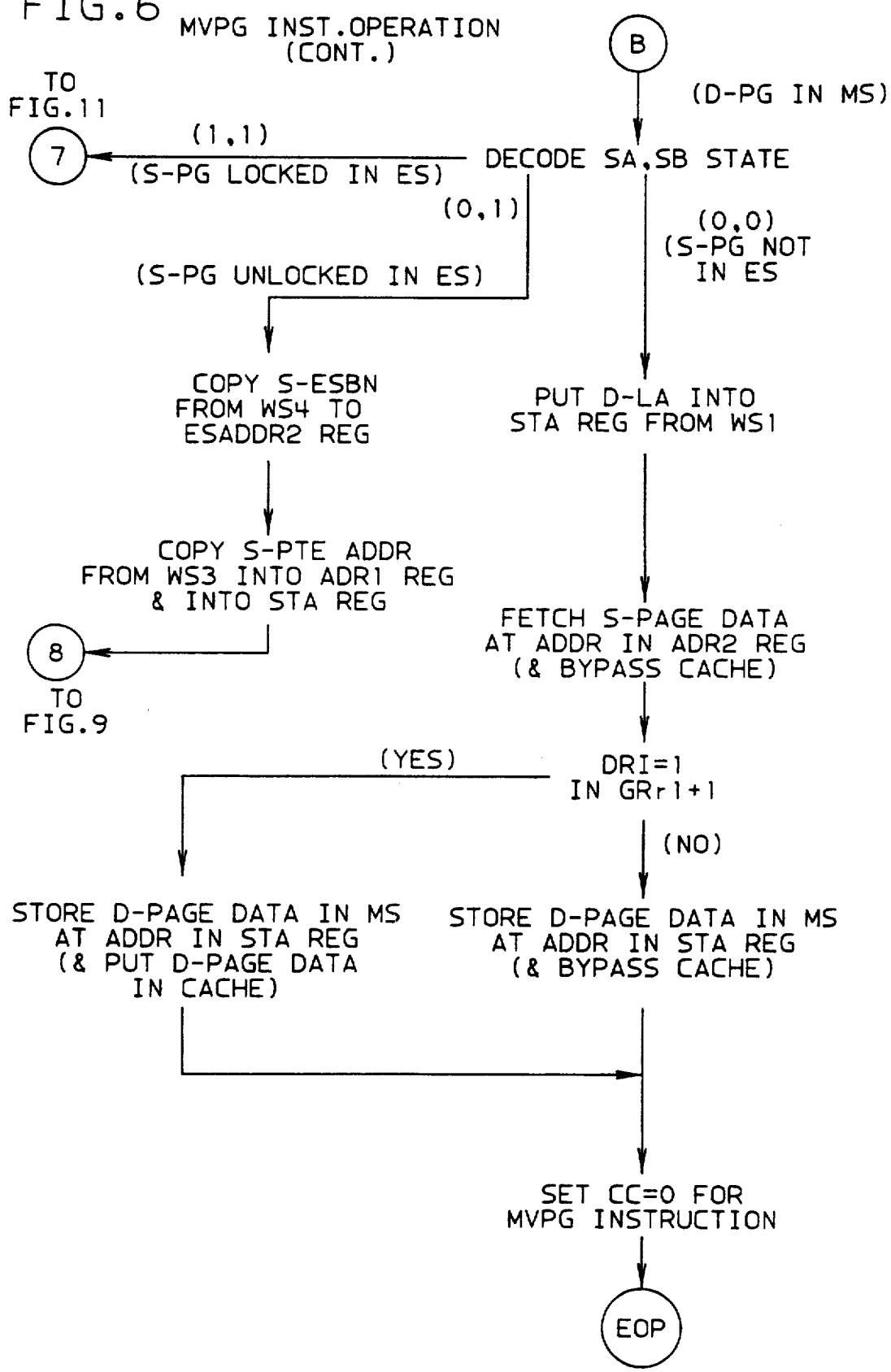
Figure 7:
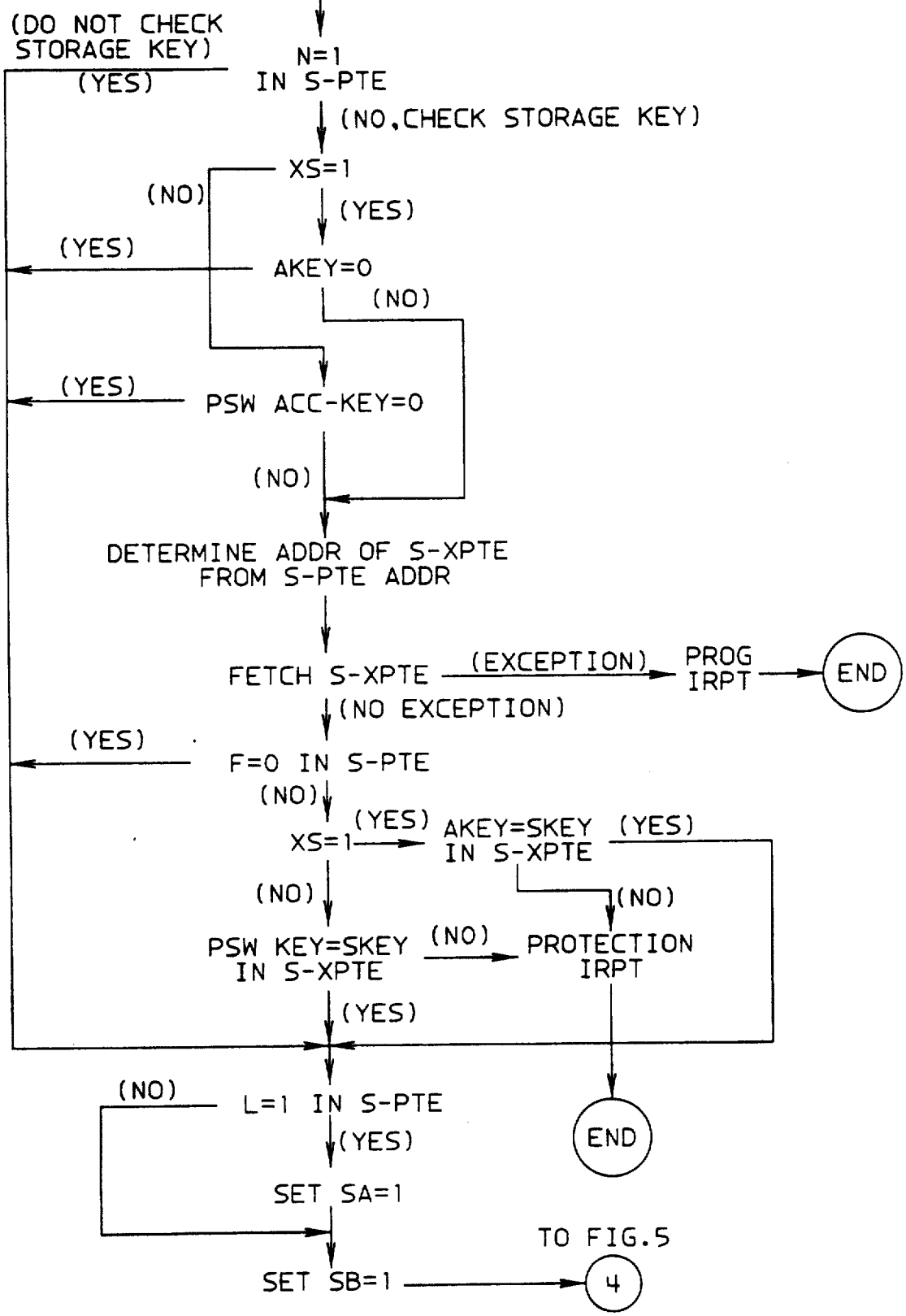
Figure 8:
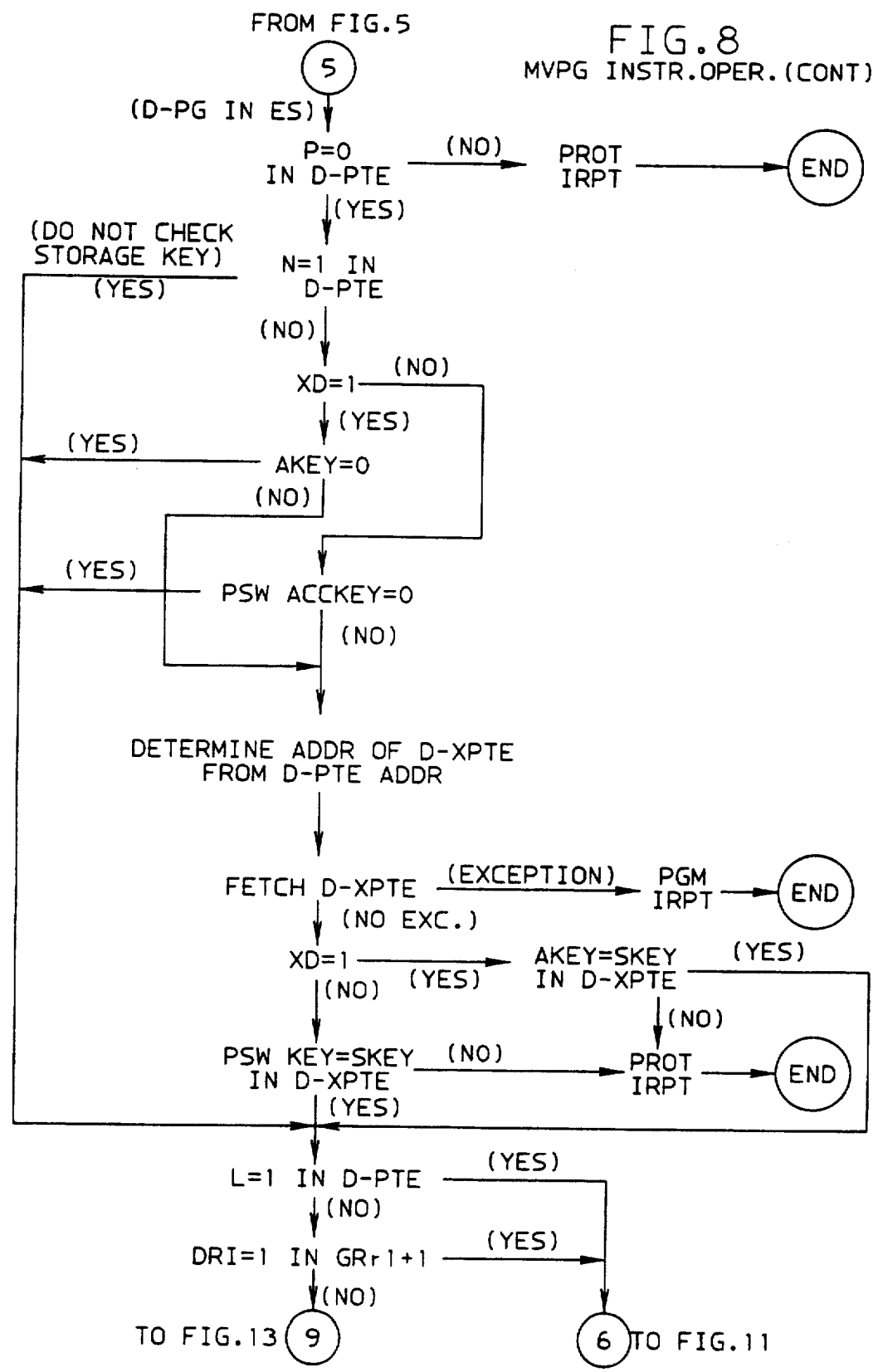

The move page process is described in FIGS. 3 through 14 which show a sequence of steps that are automatically performed by a processor machine executing a single instruction without any intervention by a supervisory control program from the first step "Decode MVPG as the Current Instruction" until a final step in the process is reached, which is either an "EOP" or "END" step. The EOP (end-of-process) step indicates a successful conclusion of the execution of the move page instruction, and leaves a condition code of zero (CC=0) in the CC field in the current PSW register to indicate the successful execution of the move page instruction to the current program. The END step indicates an unsuccessful conclusion of the execution of the move page instruction due to the occurrence of an exception condition during the execution. A non-zero condition code (CC=1 or CC=2) is left in the CC field in the current PSW register, or other coded data is left in predetermined addresses, to indicate the unsuccessful execution of the move page instruction to the current program, which may be an application program. An unsuccessful conclusion generally requires the intervention by the supervisory (privileged) control program to handle or correct the exception condition, after which the MVPG instruction is reexecuted by the processor with a likelihood that it may successfully complete (i.e. end with the EOP step).

FIGS. 1 and 2 represent hardware registers, bistable devices and storage arrays provided in a processor (CPU) for processing the preferred embodiment of the MVPG instruction shown in FIGS. 3–14. These hardware items store values and indicators used by the processor for the execution of the MVPG instruction. These items are found in various parts of the CPU such as in its instruction element (IE), execution element (EE), buffer control element (BCE), expanded storage controller (ESC), and main storage (MS).

The IE of the processor includes an instruction decode register for receiving each instruction of the current program accessed from storage for execution, including each MVPG instruction. Each MVPG instruction received by the decode register includes the operation code (opcode) and GR operand designations, including the GRr1 and GRr2 fields of an MVPG instruction in which the GRr2 field contains the logical address (LA) of a source page located in either MS or ES, and the GRr1 field contains the LA of a destination page located in either MS or ES. The LA may be either a 24 or 31 bit address controlled by setting the A bit in the current PSW (program status word) stored in the EE.

The operation of the MVPG instruction causes the data in the specified source page location to be copied into the specified destination page location. Each page in the preferred embodiment is 4096 bytes in size (referred to as 4 KB in size).

A logical address (contained in r1 and r2) may be either a virtual address (VA) or a real address, according to the 1 or 0 setting in a DAT bit, T, in the current PSW. The source and destination LAs will both have the same form i.e. either both are virtual addresses or both are real addresses as indicated by the state of the DAT bit, T, in the PSW.

Each execution of the MVPG instruction copies one page by copying the page at the source location in MS or ES to a page at the destination location in MS or ES. A program loop using the MVPG instruction may be used to copy a sequence of pages having a sequence of logical addresses.

A two bit field, AS, in the PSW (used with DAT bit T set to 1) enables flexible address space control over the virtual addresses specified for the source and destination pages of a MVPG instruction. Then, the designated virtual addresses can be located either in the same or in different virtual address spaces. If field AS is set to 00, the GRr1 and GRr2 addresses must be in the same address space. But if AS is set to 0,1 (access register mode), the GRr1 and GRr2 operands may be in different address spaces. The virtual address spaces for the GRr1 and GRr2 operands are specified by ALETs (access list entry tokens) contained in the different ARs (access registers) respectively associated with the GRr1 and GRr2. The same ALET value in both ARs specifies the same address space for both the source and destination pages of the MVPG instruction. Different ALET values these ARs specify different virtual address spaces for the source and destination pages of the MVPG instruction. (An ALET specifies a segment table used for virtual address translation in the manner disclosed in U.S. patent application Ser. No. 154,689 filed Feb. 10, 1989 by R. Baum et al. abandoned after the filing of continuation application Ser. No. 07/535,248 filed Jun. 6, 1990 and issued Dec. 12, 1990, as U.S. Pat. No. 4,979,098 and entitled "Multiple Address Space Token Designation, Protection Controls, Designation Translation and Lookaside", assigned to the same assignee as the subject application.)

The operands defined by GRr1 and GRr2 are real addresses when the DAT bit is set off (T=0) in the current PSW. If DAT is off, the MVPG instruction can only control a page copy operation within MS, because for security reasons the system architecture is structured to avoid giving any problem-state user uncontrolled direct access to ES, which would be given if the user had the ability to directly specify the ESBN value for accessing ES. The use of virtual addressing control over the ESBNs avoids having the user specify the ESBN values when the user is accessing ES. With MS, the conventional ability of allowing a user to use real addressing for accessing MS is retained for the MVPG instruction.

The type of operand addresses being provided in GRr1 and GRr2 for the MVPG instruction is indicated by the state of bits T and A in the current PSW. If bit T is 1, virtual addresses are in GRr1 and GRr2, but if bit T is 0, real addresses are in GRr1 and GRr2. If bit A is 1, 31 bit long addresses are in GRr1 and GRr2, but if bit A is 0, 24 bit long addresses are in GRr1 and GRr2.

When virtual addresses are provided by the user in GRr1 and GRr2, they respectively cause the accessing of the D-PTE and the S-PTE, via the conventional address translation operations being done in the commercial S/370 operating systems of IBM and others. However, novel forms of PTEs are used with this invention. When the PTEs are retrieved, the states of their I and V bits indicates whether the respective page is in MS or ES or in neither.

The ESA mode is set in the current PSW to indicate the processor's use of its most extensive virtual addressing mode, in which each current address space is defined by an ALET in an access register (AR) respectively associated with each GR, e.g. GRr1 and GRr2. When the same address space is used for both operands, the same ALET is loaded into both of these ARs. When different address spaces are used for the two operands, different ALETs are loaded into the two ARs.

An ALET locates a segment table in MS to define an address space in the ESA/370 architecture. Each segment table is comprised of segment table entries (STEs). Each STE, when valid, locates a page table (PT) in MS. Each PT is comprised of 256 page table entries (PTEs), and each PTE is four bytes long. In this embodiment, each PT is immediately followed by an external page table (XPT) in the same MS page frame, as shown at the bottom of FIG. 2. The XPT is comprised of external page table entries (XPTEs), each 12 bytes long. The location of each XPTE in the page frame is easily calculable from the location of an associated PTE, due to the known number of intervening PTEs and XPTEs and their known length.

When the S-LA and D-LA are virtual addresses (i.e. PSW DAT=1), the process steps "Do Address Translation for S-LA in GRr2" in FIG. 4, and "Do Address Translation for D-LA in GRr1" in FIG. 5 are inclusive of AR and DAT translation operations when these translations are existent in lookaside buffers, such as when the STD is in an ALB (access register lookaside buffer), and the translated virtual address is in a TLB (translation lookaside buffer) or if not in the TLB its PTE indicates the required page is in either MS or ES. The translation for the AR content (i.e. ALET) is a STD (segment table designator), and the DAT translation of a virtual address is an absolute address in MS or ES for a page frame assigned to contain the content of the source or destination page. The processor automatically performs the DAT translation if the TLB does not have the translation but the PTE indicates the page is in MS or ES (i.e. V,I=11 or V,I=00).

But if a virtual address does not have the required AR translation available in the ALB, and its DAT translation is not available in the TLB or its PTE indicates the page is not in either MS or ES, a page fault exception signal is generated by the processor, the MVPG instruction execution ends, and the control program is called to perform either or both of the missing translations that are into the TLB or ALB, where they are available to the processor in a reexecution of the unsuccessful MVPG instruction.

An additional general purpose register, GRr1+1, is used by the MVPG instruction to communicate certain information to the CPU for use in the execution of the MVPG instruction. GRr1+1 is the GR having the next higher GR number after GRr1. The pertinent content of GRr1+1 is shown in FIG. 1 as bits D, S, DRI and CCOP, and an AKEY field. The D and S fields control the storage protect key operations for the MVPG instruction, and the DRI and CCOP fields control special operations for the MVPG instruction that affect how the instruction is to be used in relation to its following instructions in the program.

The MVPG instruction execution may end by setting the CC bits in the PSW in the execution element in FIG. 1. When the MVPG instruction execution is successful, it is ended by providing the desired condition code, CC=0. A ending which results in CC=1 or CC=2 may be provided when the execution is unsuccessful. But the outputting of condition codes 1 and 2 can be prevented by use of the CCOP bit, which can immediately call the supervisory software for handling the condition which would otherwise have set CC=1 or CC=2.

Thus, if the CCOP bit is set to 0, then CC=1 or CC=2 is not set into the PSW. But instead, the CCOP=0 bit state enables a destination page fault interruption operation to be automatically invoked by conditions which would otherwise have caused a CC=1 or CC=2 to result in the PSW, such as immediately starting the page fault interruption software for finding the destination page in the storage hierarchy and copying it into MS. This process avoids having an additional instruction test the CC to invoke the privileged software to handle an exception.

If the CCOP (CC option) bit is set to 1, the CC=1 and CC=2 settings are set into the PSW. Then an additional test instruction is needed to sense the CC content of the PSW before the privileged software can be invoked to handle the exception. CC=2 results when the source page is not available in MS or ES. CC=1 results from any of a number of conditions including: (1) when the destination page is not available in in MS or ES, or (2) the destination page is not available in MS while the DRI bit is set to 1, or (3) an error occurred in accessing ES, or (4) the lock bit in a PTE is set to 1, or (5) a PTE format error was found. Coded bits in a predetermined MS location will define the precise condition to the intervening privileged software so that it can operate correctly.

The user of the MVPG instruction cannot control whether the source page is in ES or MS. The user of a MVPG instruction may be concerned with the destination page, since the user may use other instructions that require a copy of a page in a virtual location in MS. For this reason the MVPG instruction allows the user to influence the privileged software's choice of the MS or ES medium for the destination page. And the user's influence is expressed by his setting of the DRI (destination-reference-intention) bit in GRr1+1. If DRI is set on and the destination PTE selects MS (I,V=00), the destination page is copied into both MS and the processor cache.

But, if the DRI bit is set on (DRI=1) and if the destination PTE does not select MS (i.e. I,V in the PTE is not 00), the MVPG instruction automatically calls the privileged control program, and ends execution. The control program responds by reexamining the medium assignment in the destination PTE, and assigns it to MS if no condition exists to prevent such MS page allocation. After assigning the page to MS, the control program changes the I,V bits to the 00 state in the destination PTE to represent the page in the MS medium, and returns the processor to the MVPG instruction. A reexecution of the MVPG instruction then copies the source page into the MS destination page and inhibits the cache bypass, so that the destination page is written into the cache when it is accessed in MS.

Therefore, the DRI bit enables efficient use of the cache space by only using the cache when the user program follows the MVPG instruction with other instructions which access data in the destination page.

In a processor with a small cache, only the part of the destination page may be copied into the cache. This part is the cache unit containing the destination operand's addressed byte (e.g. cache line with that byte).

The D-PTE and S-PTE represented in FIG. 2 are used to locate the destination page and the source page of an MVPG instruction. The associated D-XPTE and S-XPTE respectively contain the addresses of the backup pages in auxiliary storage (usually on a DASD device) for the destination and source pages. The XPTE is accessed by the privileged software when a page fault occurs to a virtual address requesting a page when its PTE indicates the page is not currently valid in MS or ES.

The notation used in the FIGURES is S-PG, S-PTE and S-XPTE for a source page, its PTE and its XPTE; and D-PG, D-PTE and D-XPTE for a destination page, its PTE and its XPTE.

A novel format is used for the PTEs required by this embodiment. The single address field in each PTE contains either a PFRA (page frame real address value or a ESBN (expanded storage block number) value. Therefore, one PTE locates one page either in MS or in ES, but not in both.

Furthermore, any of plural PTE formats may be used with this invention, as long as the locations are known for the PFRA/ESBN address, and the I and V control bits. Two forms of the PTE are used with this invention which depend on the I and V control bit states. One PTE form is when I,V=11 in which the address field contains a PFRA. The second PTE form is when I,V=00 in which the address field contains an ESBN. A third form of the PTE is also supported to obtain upward compatability for the operation of the subject invention. The third PTE form is indicated by a zero value in the V control bit, which indicates a previously used PTE format that did not have any V control bit and did not virtually address the ES medium because its PTE address field could only contain a PFRA for addressing MS.

Accordingly in this invention, a page is in either MS or in ES as determined by the PTE flag bits I and V, respectively. If I,V=00 the page is in MS and then the PTE address field contains a PFRA, which locates the first byte of the page in MS. But if I,V=11 the page is in ES and then the PTE address field instead contains an ESBN which locates the page in ES, instead of MS.

However, I,V cannot be 01 because that would indicate the address in the PTE entry is valid for both an MS page and an ES page, which is not permitted because the PTE only has one address field which cannot contain two different page addresses (one in ES, and one in MS). The I,V=01 condition generates an exception signal.

Also, when the address field in the PTE does not contain a valid address, the I,V=10 condition exists during execution and a page fault exception signal is caused. The page fault exception signal causes a page fault interruption which results in the operating system software being invoked to handle the exception. The operating system assigns MS to receive the page from auxiliary storage (e.g. DASD).

If the interruption is for the source page not being in either MS or ES, the privileged software generally does not change the settings of the I,V bits in the source PTE, but merely allocates a page in MS for the destination page, if not already allocated, and copies the page from the storage hierarchy to that page.

But if the DRI bit is set to 1 in GRr1+1 when an I,V=10 or 11 due to the destination page not being allocated in MS, the privileged software generally is influenced by the the DRI=1 setting indicating the user intention that the destination medium be MS. The user will express the DRI=1 intention when the instructions in the application program (immediately following the MVPG instruction) will access the destination page. In the DRI=1 case, the privileged software will change the destination PTE's I,V bits to the 00 state after copying the source page from the storage hierarchy (e.g. MS, ES or DASD) into the MS location for the destination page.

Thus, the privileged software invoked by a page fault exception interruption on the destination PTE will assign a page frame address in MS, and this MS address is written as the PFRA in the address field in the associated D-PTE. And the privileged software sets I,V=00 in the D-PTE. Any reexecution of the MVPG instruction will then find the destination page is allocated in MS.

But if DRI=0 for a destination page that has a page fault interruption, the privileged software allocates a location in either MS or ES. If ES, the allocated ES page block number is written as the ESBN value in the address field of the associated D-PTE as the page is copied into ES by the privileged software. If MS, then the privileged software writes the PFRA of the allocated page frame into the associated D-PTE and the source page is copied into the MS destination location.

This process of setting up the content of a PTE when allocating and copying a page into MS or ES is called PTE or page validation.

Regardless of the DRI bit state, if the I,V bit setting in the S-PTE indicates MS or ES, it is not generally changed by the interrupting software. And if DRI=0, and if the I,V bit setting in the D-PTE indicates MS or ES, it also is not generally changed by the interrupting software.

As previously discussed, the generation of an exception signal causes the posting of interruption codes in MS and ends the processing of an MVPG instruction. And the ensuing program interruption invokes a supervisory control program, such as operating system software to take the action needed to handle the problem indicated by the posted exception signals. An important example of this is the use of the MVPG instruction in a program looping routine for moving a large number of pages. In this case, a page fault during the first loop executed by the MVPG routine indicates the likelihood of page faulting on every other of its MVPG looping operations, so that the savings in the test instruction execution can amount to hundreds of executions when hundreds of pages are to be transferred by the looping program routine.

The MVPG instruction is architected to enable the user to optionally avoid the use of conditional branch instructions following the MVPG instruction to test and branch on its condition code. This is done by using the CCOP (CC optional) bit in GRr1+1. If CCOP is set to 0, the MVPG instruction will force an interrupt to the privileged software automatically if an exception occurs, which eliminates the previous requirement of using branch instructions to test the CC state of the instruction each time it executes. This speeds up a program using the MVPG instruction by requiring fewer instructions in its page transfer program loop, i.e. by eliminating a resulting CC and the conditional branch instructions for testing the resulting CC value.

However merely by setting CCOP=1, the user option remains for having the MVPG instruction generate a CC value to be tested by conditional branch instructions that follow. The test of the CC value determines when the privileged software is to be called.

Each PTE used by the preferred embodiment also contains other flag bits, such as N, P, R, C and L. A storage key (SKEY) field and a fetch-protect flag bit F are found in the associated XPTE and are logically part of the PTE (they are in the XPTE due to lack of space in the PTE). The N bit setting controls whether key protection will be used for an ES page addressed by the PTE. (When an MS page is addressed by the PTE, it is implicitly protected by the storage key hardware of the processor in the conventional manner.) The P bit, if set to 1, prevents stores but allows fetches in the page addressed by the PTE in either MS or ES. If P=0, both fetches and stores are allowed into the addressed page. The R bit is set to 1 if a reference is made into the page in ES for a fetch or store. The C bit is set to 1 if a change is made into the page in ES by a store. The lock bit L is set to 1 by a local processor to warn other processors in an MP when the local processor is to about make a change in the PTE or its XPTE.

The internal operation of the MVPG instruction does not change the N, P or F bits, nor the I or V bits in any PTE. Other control bits (such as the R, C and L bits in the associated PTE) may be changed by the internal operation of the MVPG instruction.

The setting of bit N in the PTE controls whether SKEY and F fields in the associated XPTE are to be used to protect the associated page in ES. When N=0 the SKEY and F fields in the XPTE protect each access to an associated ES page against unauthorized access, by using a key-compare protect function like that done with an MS storage key and fetch protect bit for protecting accesses to an associated MS page. The MS storage key with its protect bits are located in a conventional storage key array in the processor, and they are used in their conventional manner when any MS page is accessed for the MVPG instruction. (The SKEY and F fields in the XPTE are copied into the MS storage key array when the associated page is being allocated and validated in MS to initialize the MS storage key for protecting that page in MS.)

In more detail, the ES storage key protection operates as follows: When bit N is set to 1, no storage protection is enabled for protecting accesses to the associated page in ES. When bit N is set to 0, ES page access protection is enabled for using the AKEY in GRr1+1 and/or the ACC-KEY in the PSW. Such storage key protection involves comparing the SKEY in the associated XPTE to either the ACC-KEY in the PSW or the AKEY in GRr1+1, as well as using the F bit in the XPTE, to prevent unauthorized fetch accesses to the ES page. Which of these two access keys, AKEY or ACC-KEY, is to be used for ES page protection is determined by the settings of bits D and S in register GRr1+1. (During execution of the MVPG instruction, the values of bits D and S are copied into triggers XD and XS, respectively, in which the states of bits D and S are tested.)

Thus, the states of the D and S bits in GRr1+1 determine what access key(s) will be used in the ES and MS storage protect operations for the MVPG instruction. When D=1 and S=0, the store of a destination page is controlled by the access key in the AKEY field in GRr1+1, and the fetch of a source page is controlled by the access key in the ACC-KEY field in the PSW. When D=0 and S=1, the store of the destination page is controlled by the ACC-KEY in the PSW, and the fetch of the source page is controlled is controlled by the AKEY of GRr1+1. When both D=0 and S=0, both the fetch of the source page and the store of the destination page are controlled by the ACC-KEY in the PSW. And when both D=1 and S=1, both the fetch of the source page and the store of the destination page are controlled by the AKEY of register GRr1+1.

The F field in the XPTE is a page fetch protect bit for preventing store accesses to the associated page in ES. This F bit operates like the F bit in the MS storage key as defined in the S/370 architecture. When F=0, only fetch accesses are allowed to the associated ES page on a mismatch of the access key. But when F=1, neither a fetch nor store access is allowed to the associated ES page on a mismatch of the access key, and an exception is signalled if a mismatching access is attempted. (Also, the F bit is loaded into the MS storage protect key array, not shown, when the page is moved (copied) into MS as a result of a page fault, and so that this F bit in the XPTE is then indirectly used for controlling accesses to an associated MS page.)

The "test fetch" to an MS page is used in the FIGURES herein. It implicitly involves using the MS storage protection feature to the extent that it is enabled, so that the provided and enabled exception signals are detected if the MS access protection is violated by accessing a page. A test fetch examines the existing exception states to determine if any exception signal was generated by an operation, including any exception for violation of: storage protection, dynamic address translation, and access register translation. The D and S bit states are involved in the test fetch operation regarding the fetch protection exception signals.

Processor hardware used by the preferred embodiment in the execution of the MVPG instruction includes a number of registers, arrays and triggers shown in FIGS. 1 and 2. They include address registers in the instruction element (IE), the execution element (EE), the buffer control element (BCE) and the expanded storage controller (ESC) of the processor.

The IE registers, ADR1 and ADR2, are used to hold addresses such as the logical addresses of the operands and absolute addresses used for locating PTEs in MS. The IE register STA is used to hold the logical address used for storing the destination page in ES or the absolute address used for storing the PTE in MS.

The EE has PSW registers, a general register (GR) array, a working store, registers and triggers. The EE includes an Ereg that holds a copy of the current MVPG instruction being executed. An ILC register holds the length of the current instruction for use in fetching the next instruction in the program. The PSW registers contain the fields of the current PSW, in which the pertinent fields are designated as T, ACC KEY, P, AS, CC, A and IA shown in FIG. 1. The GR array contains the 16 general purpose registers of the S/370 type processor, which is assumed to be built to the ESA/370 architecture. Any of these 16 GRs can be assigned by the MVPG instruction to be its GRr1, GRr2 or GRr1+1. The working store includes registers WS1-WS6 which are used to hold PTE addresses, PTEs, and logical addresses. A keymask (KM) register has 16 bits (that respectively correspond to the 16 different storage protect key values), in which any bit position set to a 1 state indicates its corresponding protect key is available for use by the current problem state user of the system. An AKEY register receives a copy of the AKEY field in GRr1+1 during the execution of the MVPG instruction.

In the EE, the triggers ESA, MVPG, XD, XS, SA and SB are set during the execution of the move page instruction to control its operation. The ESA mode trigger is set to 1 to indicate when the processor is in ESA mode, since the ESA mode register must be set to a 1 state as a prerequisite to executing the MVPG instruction. The MVPG mode register is set to 1 while the MVPG instruction is moving a page to ES. The XD and XS triggers are respectively set to the states of the D and S bits in GRr1+1 during the execution of the MVPG instruction. The SA trigger is set to 1 to indicate if the addressed page is valid in ES and has been locked by another processor (that set L=1 in the page's PTE) for coordinating the changing of a page by the current processor in order to maintain the integrity of the page's data in an MP environment. The SB trigger is set to 1 to indicate if the addressed page is valid in ES and is not locked.

A BCE (buffer control element) component of the processor contains the processor's cache and storage controls for enabling the processor to access the MS. It includes a PTE address register and an MS real address register, as well as the conventional DAT (dynamic address translation) means (not shown) of the processor for MS address translations. The ES translation means may also be included in the BCE, although it may instead be put in the processor microcode means in the EE component of the processor. The BCE registers include an INV-PTE (invalid PTE) register that is set to 1 when the current PTE being accessed is found to be invalid. An exception register is set to 1 when an exception occurs on the fetching of data in MS.

An ESC (expanded storage controller) contains the storage controls for enabling the processor to access ES. The ESADDR1 and ESADDR2 registers in the ESC are used to hold the destination and source addresses for pages residing in ES. The DATA-ERR trigger in the ESC indicates that a parity error or ECC error has been detected on an ES page.

A D-PTE with its D-XPTE and an S-PTE with its S-XPTE are representatively shown with their pertinent fields. They may be in different page tables in MS.

IESBE (Invalidate Expanded Storage Block Entry) Instruction

The IESBE instruction is part of the overall invention being described and claimed herein. This privileged instruction may be used by a supervisory control program to change the state of a designated PTE from valid-in-ES to invalid-in-ES and to insure that all CPUs in a multiprocessor configuration can see only the invalid-in-ES state following the completion of execution of the IESBE instruction.

Figure 16:
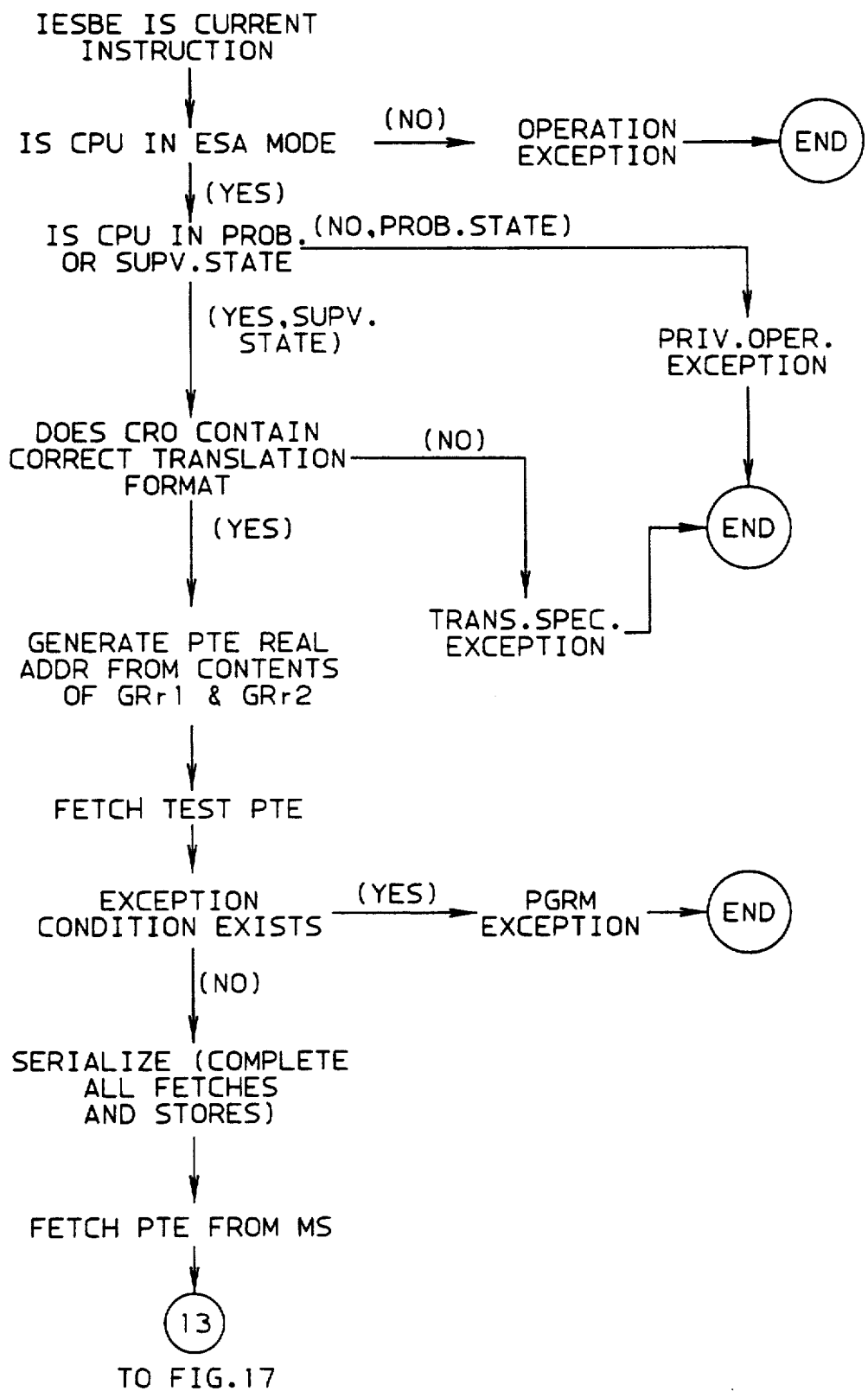

The operand of the IESBE instruction is the address of a PTE. Upon execution of the instruction, the machine sets the V bit in the designated PTE to zero and then broadcasts a request to all other CPUs to respond when they are not executing any MVPG instruction that may be accessing or modifying the contents of the designated PTE or the ES block represented by that PTE. IESBE completes only when it has received a response from each of the CPUs in the MP configuration. The detailed logic flow describing the preferred embodiment of the IESBE instruction, as perceived by the inventors, is described in FIGS. 16 and 17.

The broadcast and wait protocol used by IESBE is likely to result in elongated execution times so that frequent use of the IESBE instruction could significantly degrade system performance. Accordingly, this invention provides a more efficient means of invalidating a valid-in-ES PTE that involves the use of a locking protocol.

The locking protocol requires that MVPG acquire a one bit lock (L) prior to accessing the ES block designated by a valid-in-ES PTE. The flow describing the acquisition of the lock can be found in FIG. 9. The following steps are required: The ESMVPG trigger is set to one to indicate that this CPU holds (or is attempting to acquire) an L bit lock.

In the preferred embodiment, the ESMVPG trigger is used to determine if this CPU can respond to an IESBE request. As long as the trigger is 1, the CPU is assumed to be accessing a valid-in-ES PTE and it will refrain from responding.

Using an atomic operation, the machine verifies that the PTE is in the valid-in-ES state and that the L bit is zero and if so sets the L bit to 1.

Figure 9:
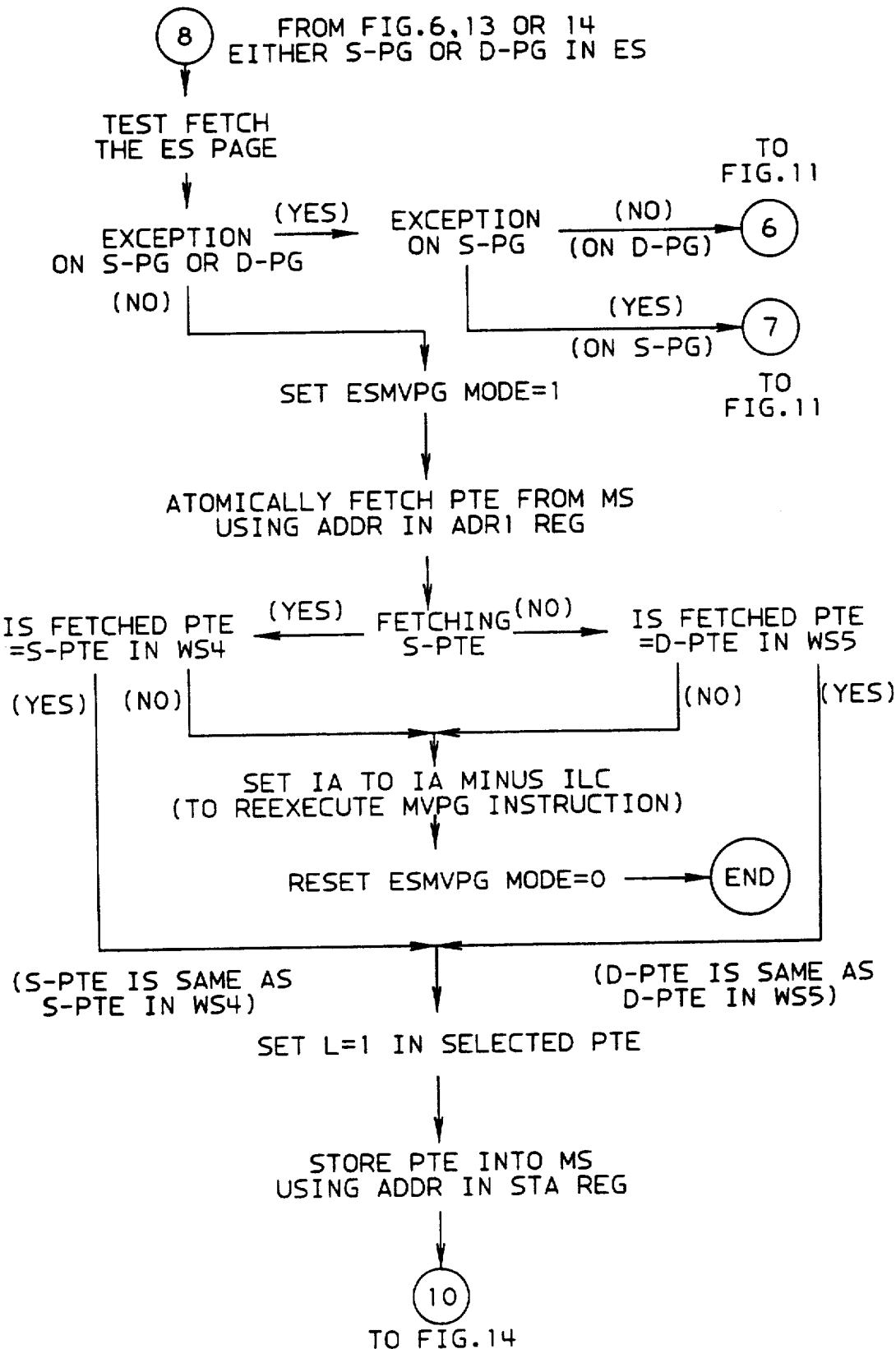
Figure 10:
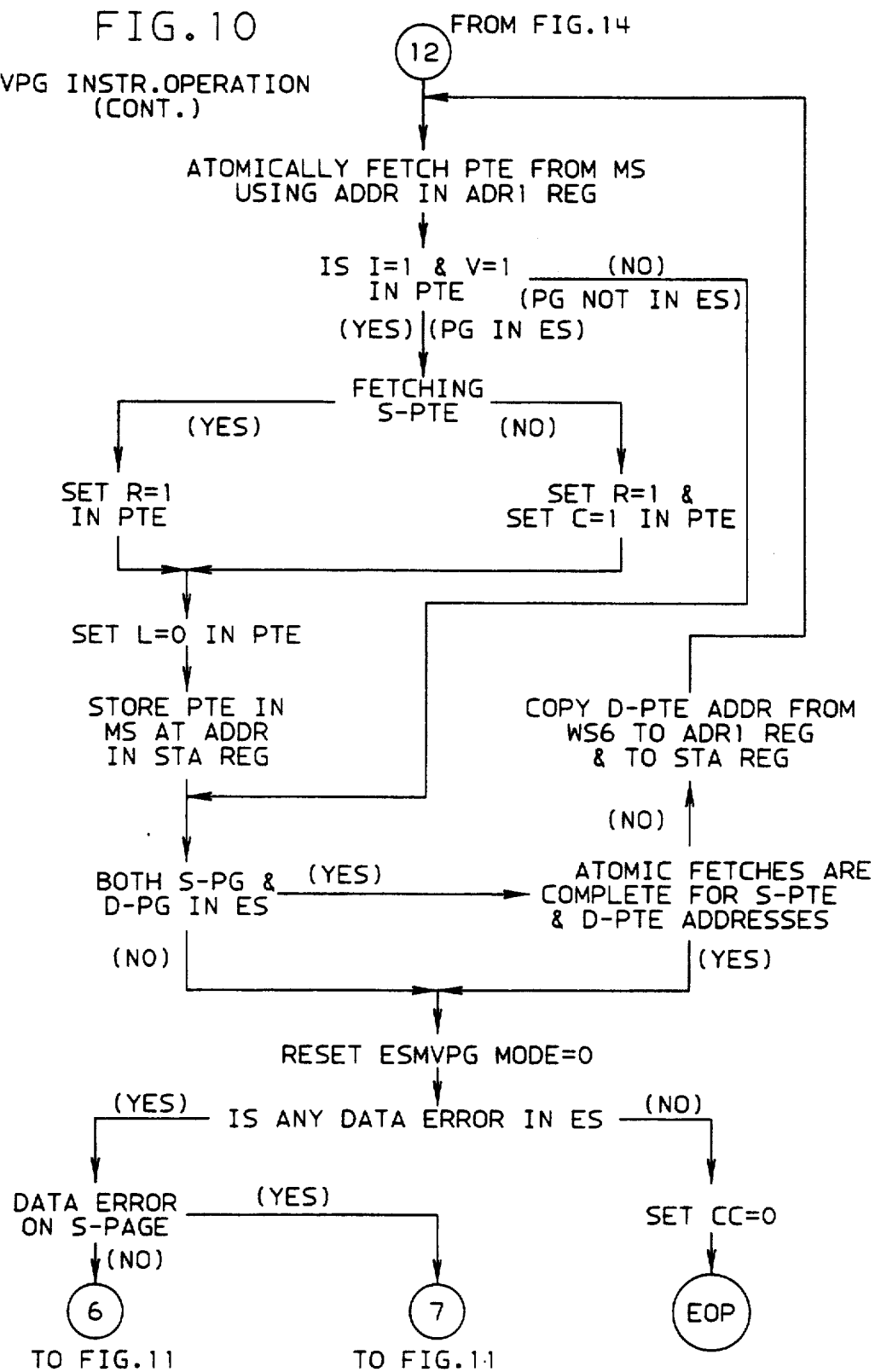
Figure 11:
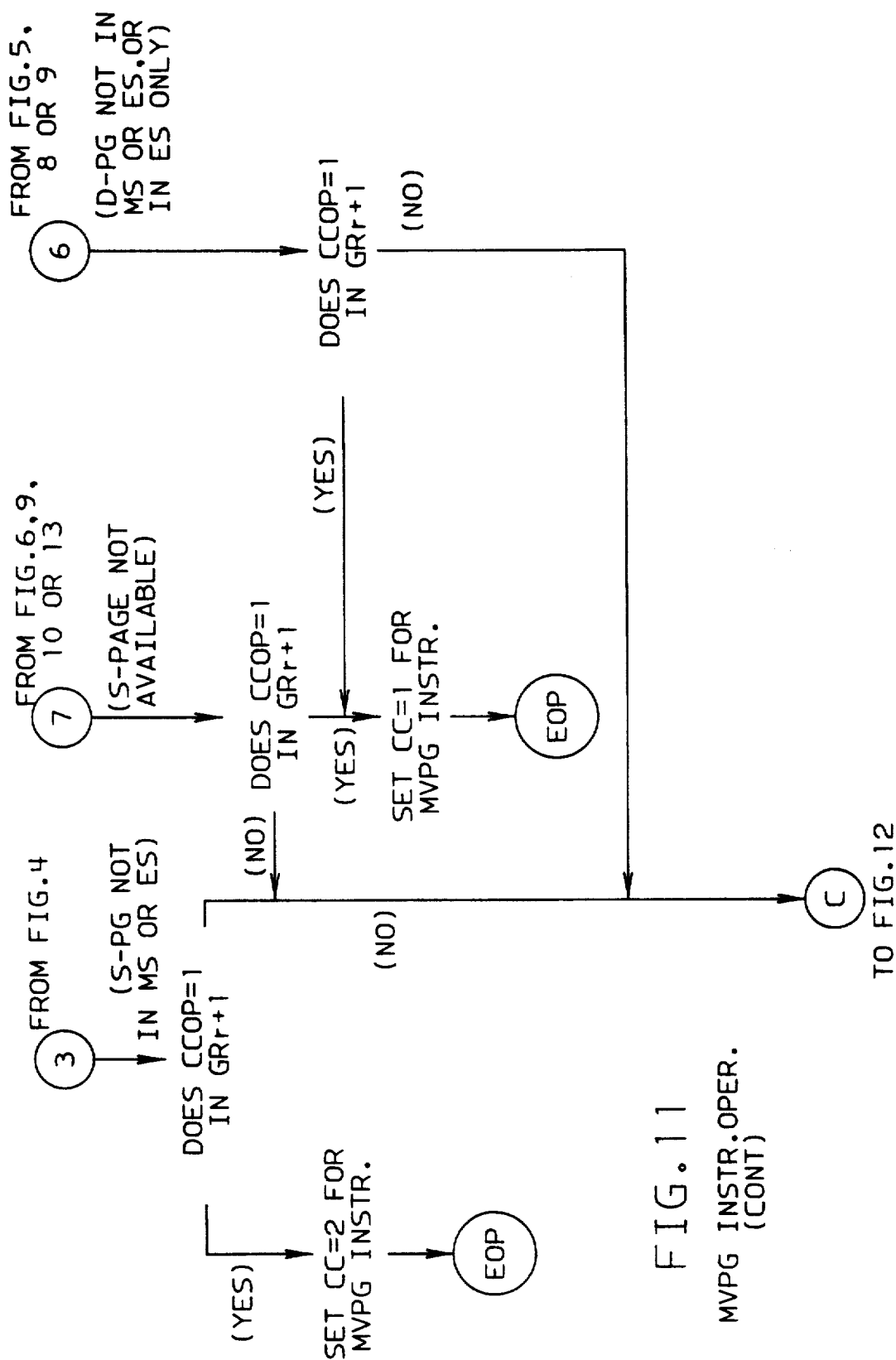

As can be seen in FIG. 9, this step is actually accomplished by verifying that the atomically fetched PTE contents are equal to a buffered version of the PTE whose state was previously determined to be V,L = 1,0. If the compare succeeds, the L bit is set to 1. Otherwise, the MVPG instruction is re-executed from the beginning.

Upon completion of the MVPG instruction, the L bit and the ESMVPG trigger are set to zero.

Therefore to invalidate a valid-in-ES PTE while assuring no other CPU is currently accessing the PTE via MVPG, the control program can simply execute a compare and swap instruction that, in an atomic operation, verifies that V,L = 1,0 and sets V to zero. If this compare and swap operation fails due to the L bit being one, the control program could repeat the operation until it completes successfully. However, the possibility exists that the L bit was erroneously set to one by a wild store or a microcode error that failed to reset the bit upon instruction completion. In either case, the compare and swap might never succeed. Therefore, after attempting the compare and swap some limited number of times, the control program may execute the IESBE instruction to invalidate the PTE and at the same time verify if the lock bit is erroneously set.

The control program may use IESBE whenever there is evidence that the L bit of a PTE is on erroneously. For example, if an MVPG fails due to the L bit being one in either the source or destination PTE, and the control program establishes that the L=1 state is persistent (e.g. by periodic inspection or by experiencing repeated failures when attempting to re-execute the MVPG instruction), the control program may issue an IESBE to detect if the L bit is on in error.

Therefore, it is another purpose of this invention to provide a means of allowing a control program to detect when the lock bit (L) in the PTE is erroneously held. This is accomplished by issuing the IESBE instruction specifying as an operand, the suspect PTE. IESBE will first set the valid in ES bit (V) to zero thereby establishing a state that will prohibit the subsequent acquisition of the L bit in that PTE by any CPU performing an MVPG. It then broadcasts a request to all CPUs to respond when they are known not to have possession of any PTE lock bits acquired during the execution of the MVPG instruction. That is, they will respond only when their ESMVPG trigger is zero. The instruction completes following the receipt of a response from each CPU. If the lock is still held following the completion of the instruction, it is known that no CPU holds this lock for the purpose of executing a MVPG instruction. If the control program protocol is such that the only valid use of the lock is by the machine during the execution of the MVPG instruction, it is known the lock is held erroneously.

MOVEPAGE Instruction Operation Under SIE

This move page invention can provide considerable performance advantages over the prior art used to effect data movement within a pageable-mode virtual machine operating in interpretive execution mode using the SIE (start interpretive execution) instruction. The SIE instruction is explained in an IBM publication entitled "Interpretive Execution" (form number SA22-7095) having a TNL with form number SN22-0692.

Pageable mode virtual machines have a level of storage, guest real, that is accessed without the aid of guest dynamic address translation (when the guest PSW specifies T=0). Although programs running in these virtual machines perceive this storage to be real, the contents of these pages may exist anywhere within the storage hierarchy (main storage, expanded storage or DASD) and are represented by host PTEs and auxiliary host control blocks. Guest program addresses are translated to host real using the facilities of SIE interpretive execution, dynamic address translation and, when applicable, access register translation. When a guest instruction fetch or operand reference attempts to address a page of guest real storage that is not currently valid in host MS, a page fault normally occurs passing control to the host control program for resolution of the fault. However, as will be seen below, when a pageable-mode DAT-off guest uses MVPG to move a page from one guest real location to another, host page faults are avoided for the operand pages.

For a pageable mode DAT-off guest, the MVPG instruction operates as shown in the flow diagrams (FIGS. 3-15), except that all test "DAT BIT T=1 IN PSW" will take the YES path. This is because, for a pageable mode guest, the SIE facility always uses dynamic address translation even when the guest PSW specifies T=0.

Figure 12:
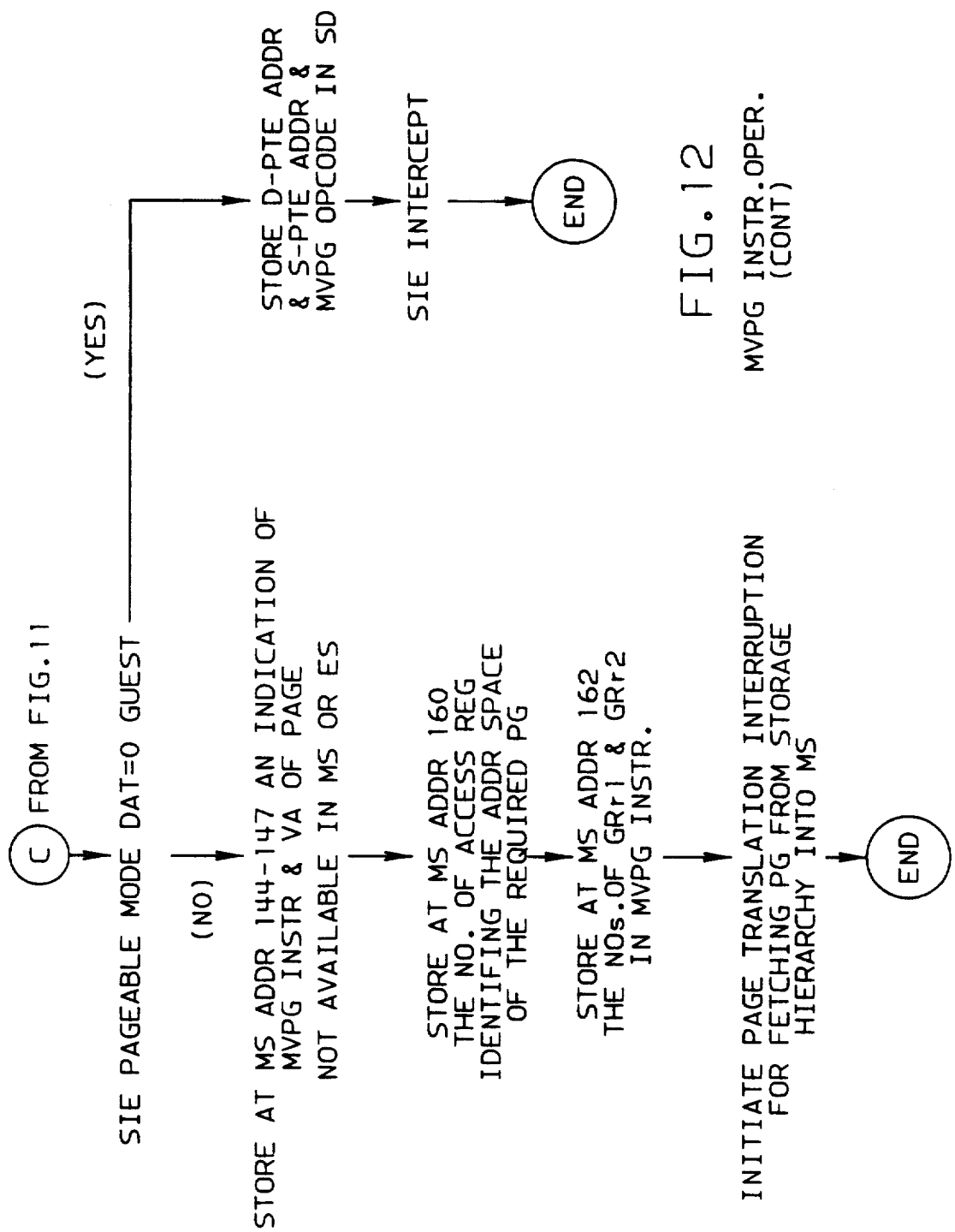
Figure 13:
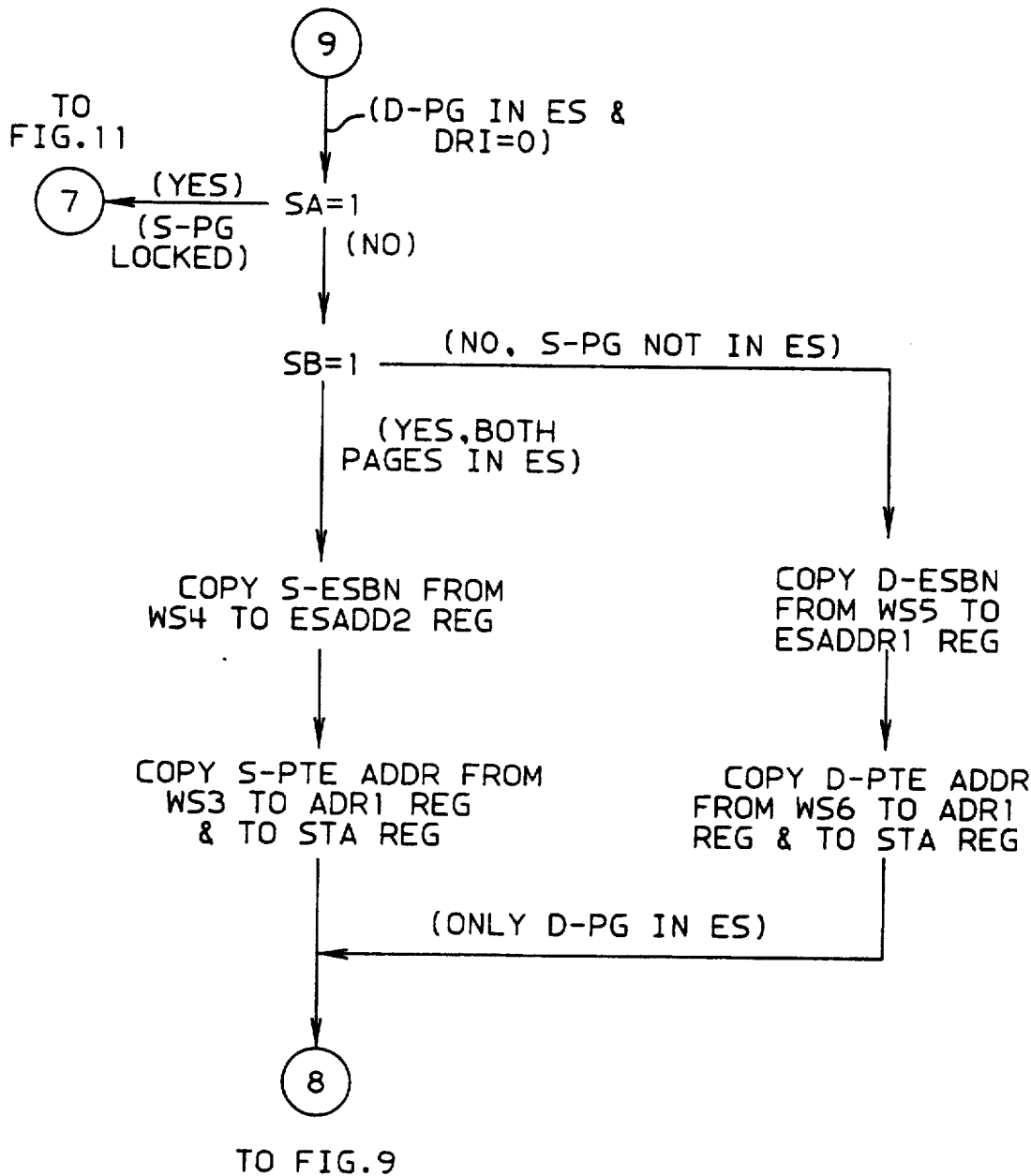
Figure 14:
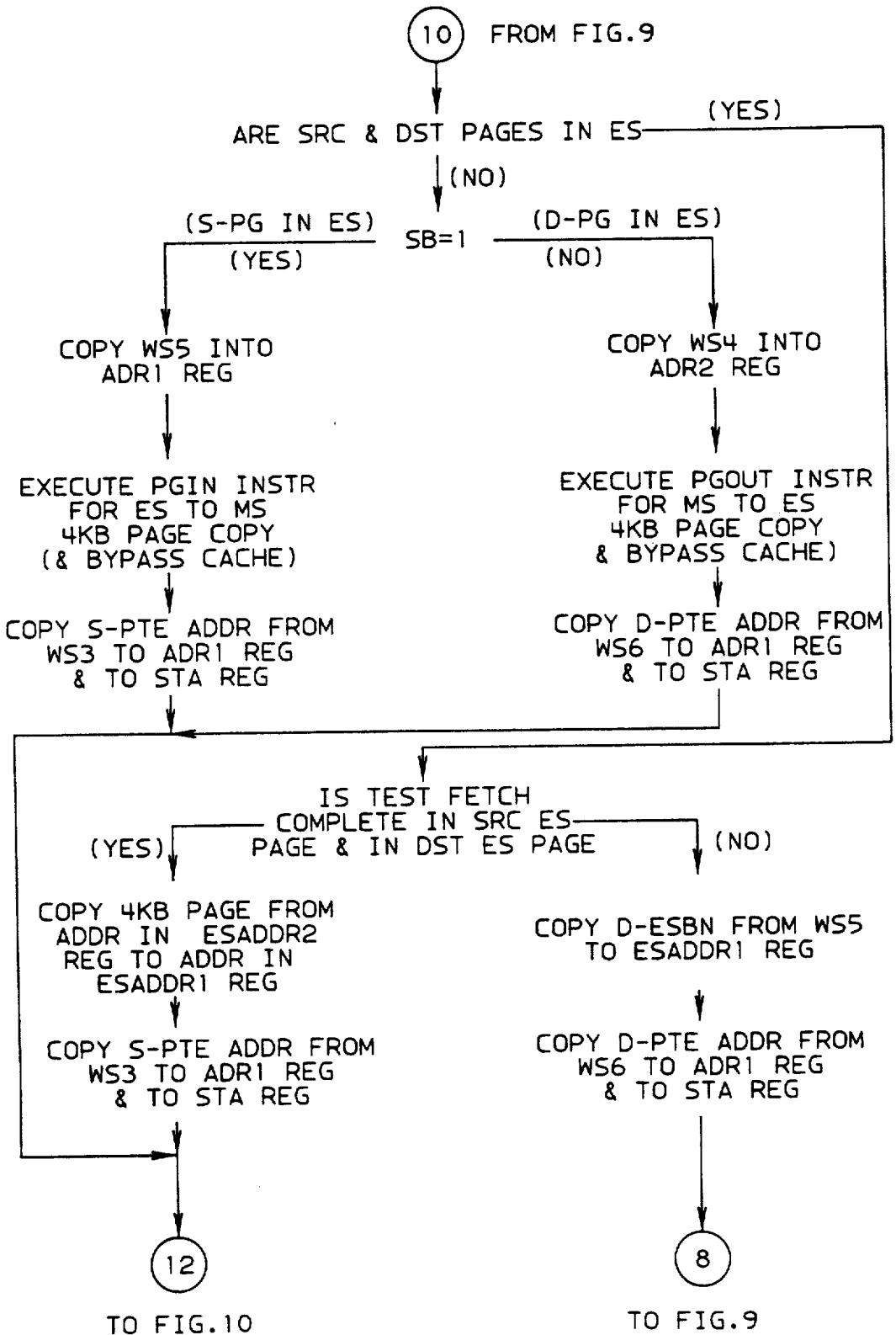

As can be seen in the FIG. 12, the move will complete successfully (without control program intervention) provided that both operand pages are in host MS or ES. When either or both pages are invalid in both MS and ES, a SIE interception (a special form of program interruption) will be generated (in the sequence shown in FIG. 12). Note that prior to this interception, the processor stores information in the guest's SD (state description) that will aid the host in completing the MVPG instruction.

The host normally responds to this interception by:
1. Assigning a destination page frame in main storage if the destination page is not currently valid.
2. Performing the requisite data transfer operation (I/O, PAGEIN or MOVE) to place the source page contents into the destination page frame,
3. Validating the destination PTE if not currently valid.

When the destination page is invalid, there is no need to bring its contents into main storage as it will be completely replaced by the source page. Nor is it necessary to validate the source page in main storage.

In all cases the MVPG is completed with a single data transfer operation and a single host program invocation. Up to three data transfer operations (one each to resolve page faults for the MVCL operands and one to perform the actual MVCL) and two page faults could be required in the prior art.

An additional advantage over prior art is that the processor provides (in the SD) the host with the actual PTE addresses that represent the operands of the MVPG. This eliminates the requirement for the host program to translate the guest real address into a host PTE address as is required when resolving page faults. This translation process can be quite complex as it could involve the simulation of both access register translation and dynamic address translation.

Accordingly, the advantages of this MVPG invention over prior art (MVCL using separate page-translation exception interruptions) when used by a pageable mode guest to move from one real storage location to another are:

1. The minimization of host control program invocations;
2. The elimination of unnecessary data transfers, and;
3. The elimination of guest real to host PTE translations.

FLOW DIAGRAMS

The flow diagrams illustrated in the FIGURES of this specification are shown in sufficient detail to be self explanatory when the drawing contents are read in conjunction with the descriptions in this specification and the following Explanation Summary of Terms:

EXPLANATION SUMMARY OF TERMS

| Term | Meaning |
|---|---|
| A | 31-Bit Addressing mode bit in the PSW. |
| ACCKEY | 4-Bit MS Storage Access Key in the PSW. |
| ADDR | 31-Bit Address. |
| AKEY | 4-Bit Storage Access Key in GRr1+1. |
| AS | 2-Bit Address Space control field in the PSW. |
| C | Change Bit in the PTEs. |
| CC | 2-Bit Condition Code field in the PSW. |
| CS | Control Store. |
| CSAR | Control Store Address Register. |
| DATA-ERR | Data Error indicating trigger. When set to 1, it indicates a data error in the ES page. |
| D or DST | Destination (Refers to an item related to a Destination Page). |
| END | A abnormal end of processing for the MVPG instruction. |
| EOP | End Of Operation for the instruction being executed. |
| EREG | 16-Bit Execution Register containing the instruction being executed. |
| ESA | Enterprise Systems Architecture. |
| ESA trigger | When 1, Enterprise Systems Architecture Mode. |
| ESBN | Expanded-Storage Block Number. |
| EXCEPTION | An abnormal condition occurring during execution of an instruction. |
| EXCEPTION trig. | When set to 1, indicates an Access Exception on Fetching Data at the Address. |
| F | Fetch-Protection Bit in an XPTE. |
| I | Invalid-in-MS bit in a PTE. Indicates the address in the PTE does not address any page in MS. |
| IA | 31-Bit Instruction Address in the PSW. |
| ILC | 3-Bit Instruction Length Code used for calculating the MS location of the next instruction to be executed. |
| INV-OP | An Invalid Operation Exception. Causes a program interruption. |
| INV-PTE | Invalid PTE trigger. When set to 1 when DAT finds the I bit in the PTE indicates its page address is invalid in MS. |
| KM | 16-Bit Key Mask in a control register. |
| L | Lock Bit in a PTE. |
| LOC | Location in MS. |
| LRA | Load Real Address instruction that executes DAT. |
| LS3 | Left shift 3-Bit positions. |
| MVPG | Move Page. Refers to the MVPG instruction or to the MVPG trigger. |
| MVPG trigger | When set to 1, it indicates a Move Page transfer to ES is in progress. |
| N | No-Key-Controlled-Protection bit in PTE. |
| P | Page-Protection bit in the PTE. |
| PAGE-TRANS | Page-Translation Exception. Causes a program interruption. |
| PGIN | Page In instruction. |
| PGOUT | Page Out instruction. |
| PGM | Program interruption for the appropriate access exception. |
| PRV-OP | Privileged Operation Exception. Causes a program interruption. |
| PROT | Protection Exception. Causes a program interruption. |
| PSW-P | Problem-State bit in the PSW. |
| PTE | Page Table Entry. |
| R | Reference bit in a PTE used for the ES page. |
| SA | Trigger indicating that the S-page is valid in ES and Locked. |
| SB | Trigger indicating that the S-page is valid in ES. |
| SKEY | Four bit storage protection key in an XPTE used to protect an associated ES page. |
| SPECIF | Specification Exception. Causes a program interruption. |
| S or SRC | Source (Refers to item related to a source page). |
| STA | 31-Bit Storage Address register used for store operations. |
| T | Dynamic Address Translation mode bit in the PSW. When set to 1, indicates the DAT mode exists in the processor. |
| TRANS-SPEC | Translation Specification exception. Causes a program interruption. |
| V | Valid-in-ES Bit in the PTE. |
| WS1 | Working storage temporary holder for the DST Operand Page Address. |
| WS2 | Working storage temporary holder for the SRC Operand Page Address. |
| WS3 | Working storage temporary holder for the Address of the PTE that is Valid in ES. |
| WS4 | Working storage temporary holder for the S-PTE or source operand real page address. |
| WS5 | Working storage temporary holder for the D-PTE or DST Operand PFRA Page frame real address. |
| XD | When 1, causes a Test Fetch in the destination Page using SKEY. |
| XPTE | External page table entry. |
| XS | When 1, causes a Test Fetch in source page using SKEY. |

TRIGGER STATE SETTINGS

Triggers are set to 0 on each instruction decode. Exception trigger is set to 0 or 1 by an exception caused by a fetch. INV-PTE trigger is set to 0 or 1 by DAT operation. DATA-ERR trigger is set to 0 or 1 by PGIN or PGOUT instruction.

While the invention has been described with reference to the preferred embodiments thereof, various modifications and changes may be made by those skilled in the art without departing from the true spirit and scope of the invention as defined by the claims hereof.

Having thus described our invention, what we claim as new and desire to secure by Letters Patent is:

1. An address control process for an instruction executable in a processor to control movement of a data block from a source location represented by a source operand to a destination location represented by a destination operand in the instruction, comprising the steps of associating a virtual address with each operand by having the operand locate an address assignment table containing an entry assigned to the virtual address, each table entry having a media indicator field assignable to one of plural random access storage media and a real address field assignable to a storage block located in an assignable random access storage medium, preassigning a storage medium from plural selectable random access storage media for each operand by a control program in an operating system by setting the media indicator field to a selected storage medium and by setting the real address field to a selected block location in the selected storage medium, and executing the instruction within an program to control movement of a data block from a block location in a storage medium preassigned to the source operand to a block location in a storage medium preassigned to the destination location, with the block location preassigned to the source operand being in a different medium from, or in same medium as, a block location preassigned to the destination operand, without the instruction specifying a source storage medium and a destination storage medium.

2. An address control process in a processor as defined in claim 1, further comprising the step of:
providing a plurality of type of PTEs, in which the different PTE types have different settings of the media indicator field associated with an operand.

3. An address control process in a processor as defined in claim 2, further comprising the step of:
providing the medium indicator field with bits located at predetermined positions in each PTE to indicate a particular PTE type.

4. An address control process in a processor as defined in claim 3, further comprising the step of:
providing a single bit for a main storage (MS) medium indicator at one predetermined position in each PTE-type, and providing a single bit for an expanded storage (ES) medium indicator at another predetermined position in each PTE-type,
detecting one PTE-type as a combination of a 0 bit in the MS medium indicator and a 0 bit in the ES medium indicator as indicating the address field in the PTE contains a valid page address in MS,
but detecting another PTE-type as a combination of a 1 bit in the MS medium indicator and a 1 bit in the ES medium indicator indicating the address field in the PTE contains a page address valid in ES, and
a detecting that no valid PTE-type exists for a combination of a 1 bit in the MS medium indicator and a 0 bit in the ES medium indicator which indicate a real address field in the PTE is invalid in both MS and ES.

5. An address control process in a processor as defined in claim 1, further comprising the step of:
using an operating system operating in supervisor state for setting the plural media indicating field in a PTE to be a selected state for indicating which one of plural media contains an addressed page and for setting a real address field in the PTE to a physical address in a selected medium for locating a page, and preventing the content of the PTE from being changeable by any instruction operating in a non-supervisory state.

6. An address control process in a processor as defined in claim 5, the processor having the capability of operating in a multiprocessor system (MP), the processor executing an instruction in any state using the further steps of:
testing the state of a lock field in an accessed PTE to determine a locked/unlocked state for the page addressed by the PTE to determine if a processor is permitted to access the page,
ending the execution of the instruction if the locked state is indicated for the PTE, but if the locked state is not indicated for the PTE, setting the lock field to the locked state for indicating to any other processor in the system that the page addressed by the PTE is not to be accessed by another processor, so that the processor which set the locked state can obtain exclusive access to the PTE addressed page.

7. An address control process in a processor as defined in claim 6, further comprising the step of:
setting a single bit position in the PTE for controlling the lock field.

8. An address control process as defined in claim 6, a processor in the MP executing the instruction including the steps of:
testing the lock field in an accessed source PTE and in an accessed destination PTE to determine the state of the lock fields in both PTEs, and
if an unlocked state is indicated in both the source PTE and the destination PTE, setting the lock field to the locked state in both PTEs for indicating to each other processor in the system that the page addressed by each PTE is being exclusively held by the processor which set the lock fields to the locked state to warn the other processors not to access a selected page of either PTE while the locked state exists.

9. An address control process as defined in claim 6, a processor in the MP executing the instruction including the steps of:
testing the lock field in an accessed source PTE and in an accessed destination PTE to determine the state of the lock fields in both PTEs, and
if unlocked states are indicated in both the source PTE and the destination PTE, setting the lock fields to the locked state in both PTEs for indicating to each other processor in the system that addressed pages in a selected medium are being exclusively held by the processor which set the lock fields to the locked state to prevent access to the PTE's page in the selected medium by any other processor while the locked state exists.

10. An address control process as defined in claim 9, in which another processor in the MP is executing the instruction, the locked state in an accessed PTE further including the step of:
indicating to each other processor in the MP accessing the PTE that an addressed page is in a locked state and is not to be accessed by any other processor than the processor which set the lock field to the locked state which another processor may be accessing another page in the same medium or in any other medium if the other page is addressed by another PTE not having a conflict.

11. An address control process as defined in claim 6 for enabling a subsequent non-privileged instruction to use a plural-media PTE even when a PTE's lock field is set to lock state, the processor performing the steps of:

setting the processor to supervisory state, and initiating the execution of an instruction for invalidating a page addressed to the plural-media PTE using the steps of:

setting all media fields in an accessed PTE to indicate no page is validly represented by the PTE, broadcasting a signal to each other processor in the MP requesting a response on whether any other processor is executing an instruction using the PTE, waiting until all other processors in the MP respond to the broadcast signal and indicate that no other processor is executing an instruction using the PTE, and ending the execution of the instruction for invalidating a page.

12. An address control process as defined in claim 6 for enabling a subsequent instruction to use a plural-media PTE even when a PTE's lock field is set to lock state, the processor performing the steps of:

setting the processor to supervisory state, and initiating the execution of an instruction for invalidating a page addressed in a non-MS medium by a plural-media PTE using the steps of:

setting a non-MS media field in the accessed PTE to indicate the page represented by the PTE is not validly contained in the non-MS medium, broadcasting a signal to each other processor in the MP requesting a response on whether any other processor is executing an instruction using the PTE, waiting until all other processors in the MP respond to the broadcast signal and indicate that no other processor is not executing any instruction using the non-MS medium, and ending the execution of the instruction for invalidating a page.

13. An address control process as defined in claim 6 for enabling a subsequent instruction to use a plural-media PTE even when a PTE's lock field is set to lock state, the processor performing the steps of:

setting the processor to supervisory state, and initiating the execution of a page invalidation instruction for invalidating a page addressed in an ES medium by the plural-media PTE using the steps of:

setting an ES media field with which a lock field is associated in an accessed PTE to indicate that no ES page is validly addressed by the PTE, broadcasting a signal to each other processor in the MP and requesting a response from each other processor that the other processor is not executing an instruction requiring a lock field to be held in a locked state in the PTE, waiting until all other processors in the MP respond to the broadcast signal to determine that no other processor is executing an instruction requiring access to ES, and ending the execution of the page invalidation instruction with any lock state of the PTE being disabled by an invalid state of an ES medium field.

14. An address control process as defined in claim 6 for enabling a subsequent instruction to use a plural-media PTE even when a PTE's lock field is set to lock state, the processor performing the steps of:

setting the processor to supervisory state, and initiating the execution of a page invalidation instruction for a plural-media PTE using the steps of:

setting the media fields in an accessed PTE to indicate the page represented by the PTE is not validly contained in any media represented in the PTE, broadcasting a signal to each other processor in the MP indicating a broadcast page address in the PTE for a particular medium, and requesting a response from each other processor on whether another processor is executing an instruction addressing the page at the broadcast page address, waiting until all other processors in the MP respond to the broadcast signal that no other processor is using the broadcast page address, and ending the execution of the page invalidation instruction.

15. An address control process in a processor as defined in claim 1, further comprising the step of:

providing plural bit positions in the PTE for representing the media indicating field, and using a particular state for each bit position as the selected state for a represented medium, in which no more than one bit position of media indicating field is set to a select state.

16. An address control process in a processor as defined in claim 1, further comprising the step of:

providing a page fault signal when no media field has a selected state during dynamic address translation, and requiring a page represented by the PTE to be accessed by a control program of an operating system operating in supervisory state from a medium other than an electronic medium represented by media indicating field in the PTE.

17. An address control process in a processor as defined in claim 1, further comprising the step of:

providing a protection key field in the PTE or locatable from the PTE for indicating a protection key status for a PTE addressed page in a selected one of plural media.

18. An address control process in a processor as defined in claim 17, further comprising the step of:

providing change and reference fields within the PTE or locatable from the PTE for respectively indicating any change in or reference to a PTE addressed page in a selected medium.

19. An address control process in a processor as defined in claim 17, further comprising the step of:

providing a fetch protection field in the PTE or locatable from the PTE for indicating when fetch protection exists for the PTE addressed page in the selected medium.

20. An address control process in a processor as defined in claim 17, further comprising the step of:

providing a no-key protection field with each PTE for indicating the disablement of key protection for the PTE addressed page in the selected medium regardless of the setting of the protection key field of the PTE.

21. An address process in a processor as defined in claim 13, further comprising the step of:

setting a single bit position within each PTE for each of a change field, a reference field, a fetch protection field, and the no key field.

22. An address control process as defined in claim 20, the processor further executing the step of:

enabling the activation of a supervisory control program prior to ending its execution in a current processor state.

23. An address control process used by an instruction execution process defined in claim 1, further comprising the steps of:

setting the processor to any operating state for enabling the execution of any program, including any application program, executing the instruction in which a source operand specifies a source operand virtual address and a destination operand specifies a destination operand virtual address, each of the two operand virtual addresses being subject to translation using the same or different translation tables to respectively obtain a source operand PTE and a destination operand PTE, allowing a structure for the instruction to be independent of the media selected for accessing the pages of the instruction operands, accessing the media indicator fields in a source PTE and in a destination PTE to determine if both a source medium and a destination medium have been selected in the respective PTEs, the same or different electronic storages being selectable for the source medium and the destination medium, and obtaining a source page address from the source PTE and obtaining a destination page address from the destination PTE, reading a source page at the source page address in the source electronic storage, writing data read from the source page into a selected destination electronic storage at the destination page address, and the processor being allowed to retain its processing state (including a non-supervisory state) during a successful execution of the instruction.

24. An address control process as defined in claim 23, the processor further executing a page copy process including the steps of:

signalling an exception in the processor if a source medium and a destination medium are not both selected in the respective PTEs to indicate a lack of success in the execution of the instruction;

and suppressing the execution of the instruction due to the exception to permit a supervisory control program to switch the processor to supervisory state, select a medium, and set a corresponding media indicating field in the source or destination PTE not having a selected medium, or in both PTEs if neither indicates a selected medium.

25. An address control process as defined in claim 24, the processor further executing the steps of:

activating a page fault handler routine in response to the signalling of an exception when no medium indicating field is selected in either the source PTE or the destination PTE, or both, for enabling the control program to:

select an available medium, and set an associated medium bit to selected state in each PTE needing a medium selection, and assign a page frame in a selected medium, and set the address field in an associated PTE to the location within the selected medium for an assigned page frame.

26. An address control process as defined in claim 23, the processor further executing the steps of:

setting a condition code in the processor if a source medium and a destination medium are not both selected to indicate lack of success in accomplishing a page operation, and ending the execution of the instruction.

27. An address control process as defined in claim 13, the processor further executing the step of:

providing an instruction termination option field with an operand of the instruction to indicate whether the instruction will complete by setting a condition code or whether the instruction will complete by causing an exception condition that enables a supervisory control program to intervene after completion of the instruction to handle any existing page fault exception condition without having a following branch instruction.

28. An address control process as defined in claim 27, the processor further executing the steps of:

sensing when the instruction termination option field indicates the instruction will complete by setting a condition code, and setting a condition code to indicate any exception status found during the execution of the instruction.

29. An address control process as defined in claim 23, the processor further executing the steps of:

setting to a selected state one of the media indicator fields in each PTE to indicate a real electronic storage residence of the page represented by the PTE.

30. An address control process as defined in claim 23, a processor in the MP executing the instruction including the steps of:

testing the lock field in an accessed source PTE and in an accessed destination PTE to determine the state of the lock fields in both PTEs, and if an unlocked state is indicated in both the source PTE and the destination PTE, setting the lock fields to the locked state only in each PTE selecting a non-MS medium page for indication to each other processor in the system that a non-MS medium page selected by the PTE is being exclusively held by the processor which set the lock field to the locked state to warn the other processors not to access the selected non-MS medium page while the locked state exists in the PTE, in which the the lock field in a PTE is used only to provide a locked state for a non-MS medium page indicated as the selected medium in the PTE, and using other means for locking a page in MS.

31. An address control process as defined in claim 30, the processor further executing the step of:

setting a single bit position in each PTE to a predetermined state for indicating the locked state for a non-MS medium selected by the media indicating fields in the PTE.

32. An address control process as defined in claim 23, the processor further executing the step of:

providing protection key fields respectively for the source PTE and for the destination PTE for containing a respective protection key assigned to an addressed page in a non-MS medium indicated as the selected medium in the respective PTE.

33. An address control process as defined in claim 32, the processor further executing the step of:

providing a no key protection field for each PTE for indicating when no key protection is being provided for a PTE addressed page in any non-MS media indicated as the selected medium in the PTE regardless of the setting of the protection key field of the PTE.

34. An address control process in a processor as define in claim 33, further comprising the step of:
setting a single bit position within each PTE for each of a lock field, a change field, a reference field, a fetch protection field, and the no key field.

35. An address control process as defined in claim 23, the processor further executing the step of:
providing change and reference fields for each PTE for indicating any change in or reference to a PTE addressed page in a non-MS media indicated as a selected medium in the PTE.

36. An address control process as defined in claim 23, the processor further executing the step of:
providing a fetch protection field for each PTE for respectively indicating if fetch protection exists for an addressed page in any non-MS media indicated as a selected medium in the respective PTE.

37. An address control process as defined in claim 23, the processor further executing the step of:
detecting an intention parameter provided in a field associated with an operand of the instruction, in which a parameter indicates to the operating system a preference that the destination page of the instruction be stored in a particular electronic storage medium.

38. An address control process as defined in claim 37, the processor further executing the step of:
presetting the intention parameter field to indicate that MS is the storage medium preferred as the destination medium for the instruction, and
activating a supervisory control program in response to a preset intention parameter if MS is not the selected medium in a destination PTE to enable the control program to determine if a page frame in MS can be assigned to the destination medium.

39. An address control process for a page copy instruction as defined in claim 23, further comprising the step of:
bypassing cache used by the processor when the processor is accessing data for a source page in any medium for being copied to a destination page.

40. An address control process as defined in claim 39, further comprising the step of:
bypassing cache used by the processor when the processor is copying data from a source page to a destination page,
inhibiting the bypassing of the cache to allow copying of the source page into the cache if the destination PTE indicates that MS is a selected destination medium.

41. An address control process as defined in claim 39, further comprising the step of:
presetting an intention parameter field associated with an address being translated and the intention parameter indicating that MS is the storage medium preferred as a destination medium for the instruction,
activating a supervisory control program during execution of the instruction if MS is not the selected medium in a destination PTE being used by the instruction to enable a control program in the operating system to reexamine the selection of a destination medium in the destination PTE,
reexecuting the instruction, including bypassing cache used by the processor when the processor is accessing data for the source page or the destination page,
inhibiting the bypassing o the cache to allow copying of at least an addressed part of the destination page into the cache if the destination PTE indicates that MS is a selected destination medium and the intention parameter is set to indicate that MS is the preferred medium.

42. An address control process as defined in claim 41, further comprising the step of:
copying into the cache while inhibiting a cache bypass of only a cache unit of data containing a byte addressed by the destination operand of the instruction in response to a parameter indicating MS.

43. An address control process as defined in claim 41, further comprising the step of:
copying into the cache while inhibiting a bypass for an entire destination page of data containing a byte addressed by a destination operand of the page copy instruction in response to a parameter indicating MS.

44. An address control process as defined in claim 39, further comprising the step of:
bypassing cache used by the processor when the processor is accessing data for a source page in any medium and for a destination page in a non-MS medium.

45. An address control process as defined in claim 23, further comprising the further step of:
bypassing cache used by the processor when the processor is executing the instruction.

46. An address control process as defined in claim 23, the processor further executing the steps of:
providing an instruction termination option field with an operand of the instruction to indicate whether the instruction will complete by setting a condition code or whether the instruction will cause an interception to a host control program to handle all page fault exception conditions determined during the execution of the instruction.

47. An address control process as defined in claim 46, the processor further executing the steps of:
sensing when the instruction termination option field indicates that an emulation mode interception will occur to a host control program to handle all page fault exception conditions determined during the execution of the instruction,
detecting when the program containing the instruction is a guest program operating under emulation mode with the guest program operating in a real addressing mode, p1 storing into a state descriptor control block a representation of the contents of the instruction and information on all existing page fault exception conditions, and
initiating an emulation mode interception to the host control program for enabling a single interception to handle all page fault exception conditions that can be caused by the instruction.

48. A page copy process in processor having an electronic main storage (MS), an electronic expanded storage (ES), and means for executing instructions, the execution means determining an address space for each virtually addressed operand specified by an instruction by using a segment table specified for the operand, each segment table containing segment table entries (STEs) for addressing page tables, each page table comprised of page table entries (PTEs) for locating pages, the page copy process comprising the steps of:

setting the processor to problem state and to virtual addressing state, executing a page copy instruction containing an operation code and two operands that specify a source operand virtual address and a destination operand virtual address each using a respectively accessed segment table, the respectively accessed segment table being the same or different segment tables for the two operands, and the operand specifications being independent of a particular medium containing the pages to be accessed therefrom, applying the source operand virtual address and the destination virtual address to the respectively accessed segment table to locate a respective page table for each virtual address and access a first PTE containing a location of a source page and second PTE containing a location of a destination page, the first and second PTEs being in the same or different page tables for the two operands, accessing control fields in the first and second PTEs to determine which of MS or ES is the electronic storage containing the respective locations of the source page and of the destination page, reading the source page at the location in the electronic storage determined by the first PTE, writing the data read from the source page into the destination page at the location in the electronic storage determined by the second PTE, indicating the success or lack of success in the reading of the source page and in the writing of the source page into the destination page to accomplish a virtual page move that occurs physically between ES and MS, or within MS, or within ES, and any successful indication being provided without the processor leaving the problem state.

49. A page copy process in a processor as defined in claim 48, further comprising the steps of:

having a parameter with the page copy instruction to provide a selection of an optional user choice of not having the indication for an unsuccessful indication, and instead activating a supervisor control program to handle the condition causing the unsuccessful indication.

50. A page copy process in a processor as defined in claim 48, further comprising the steps of:

setting the parameter to activate a control program for any unsuccessful indication for eliminating the need for a following conditional branch instruction to test any lack of success indication for the execution of the page copy instruction.

51. A page copy process in a processor as defined in claim 48, further comprising the steps of:

causing an unsuccessful indication upon an occurrence of a page fault exception condition, and activating a supervisory control program prior to again performing the execution of the page copy instruction in order for the supervisory control program to handle the page fault exception condition.

52. A page copy process in a processor as defined in claim 48, further comprising the steps of:

setting a parameter to select having condition codes as an optional user choice for providing an indication for a successful or unsuccessful completion of the execution of the page copy instruction.

* * * * *